(12) United States Patent
Miyazaki

(10) Patent No.: US 7,952,228 B2
(45) Date of Patent: May 31, 2011

(54) POWER SUPPLY APPARATUS AND ELECTRONIC APPARATUS

(75) Inventor: Takahiro Miyazaki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 282 days.

(21) Appl. No.: 12/254,209

(22) Filed: Oct. 20, 2008

(65) Prior Publication Data
US 2009/0184580 A1    Jul. 23, 2009

(30) Foreign Application Priority Data
Jan. 17, 2008  (JP) ................... 2008-007597

(51) Int. Cl.
*H02J 3/00*   (2006.01)
*G06F 1/00*   (2006.01)

(52) U.S. Cl. ............... 307/41; 307/82; 713/300

(58) Field of Classification Search ............ 307/18, 307/82, 41; 713/330
See application file for complete search history.

(56) References Cited

U.S. PATENT DOCUMENTS
6,084,383 A * 7/2000 Borinsky et al. ............ 323/268

FOREIGN PATENT DOCUMENTS
| JP | 8-79970 | 3/1996 |
| JP | 2536933 | 3/1997 |
| JP | 2007-49822 | 2/2007 |

* cited by examiner

*Primary Examiner* — Michael Rutland Wallis
(74) *Attorney, Agent, or Firm* — Fujitsu Patent Center

(57) ABSTRACT

A plurality of primary power supplies convert a primary power supply voltage into intermediate voltages. Secondary power supplies convert the intermediate voltages converted by the primary power supplies into supply voltages and output the same. A timing adjuster is inputted thereto plural sorts of power converted into the intermediate voltages from the plural primary power supplies to perform timing adjustment to absorb a difference in start timing between the plural primary power supplies, and causes the secondary power supplies to output the supply voltages. When the power is supplied from the plural power supplies to the load elements, stable power can be supplied to the load elements even if a difference in start time generates between the plural power supplies.

16 Claims, 14 Drawing Sheets

POWER SUPPLY APPARATUS AND ELECTRONIC APPARATUS

BACKGROUND OF THE INVENTION (1) Field of the Invention

The present invention relates to a technique for supplying power of a plurality of bus power supplies in, for example, an IBA (Intermediate Bus Architecture) power supply system.

(2) Description of Related Art

Recent trend toward voltage reduction/large current consumption of elements (load elements) causes fluctuations in voltage due to voltage drop in wiring. To suppress such the fluctuations in voltage, a power supply in POL (Point Of Load) system (hereinafter, referred to as POL power supply) tends to be used, in which the power supply is arranged very close to the elements, as noted in patent document 1 below.

To directly pull the power-feeding power supply on the primary side in the POL power supply prevents a reduction in size of the POL power supply and makes it difficult to secure insulation inside the apparatus. A known technique having overcome this problem is IBA (Intermediate Bus Architecture) power-feeding power supply, in which an insulated power supply for converting the voltage of the primary power-feeding power supply into a voltage (intermediate voltage, intermediate potential) lower than that of the primary power-feeding power supply is arranged in the preceding stage of a small-sized non-insulated power supply (POL converter), and a low-voltage power generated by this insulated power supply is supplied to the non-insulated power supply to decrease the insulation withstand voltage inside the apparatus.

In such an IBA power-feeding power supply configuration, the capacity of the insulated power supply for supplying the power to the non-insulated power supply is increased with an increase in electric power of the apparatus. For reasons that use of an insulated power supply having a lower height and a small-to-middle capacity agreeing with the height of outer dimensions of the load element can materialize a compact apparatus, and that combined use of the same type of the insulated power supply can realize improved economy rather than many types of the apparatus are manufactured, each in a small quantity, according to the load capacity, recent trend is combined use of a plurality of insulated power supplies having about 50 to 200 Watt output capacity, as the insulated power supply.

FIG. 11 is a diagram schematically showing an example of configuration of a power supply apparatus having a known IBA power-feeding power supply configuration.

In the example shown in FIG. 11, non-insulated power supplies DCDC13 to DCDC17 are arranged near load elements LOAD11 and LOAD12, a plurality (two in the example shown in FIG. 11) of insulated power supplies DCDC11 and DCDC12 are arranged in the preceding stage (in the upstream) of the non-insulated power supplies DCDC13 to DCDC17, wherein the power is fed from the insulated power supply 11 to the non-insulated power supply 13 and 14 and from the insulated power supply DCDC 12 to the non-insulated power supplies DCDC15 to DCDC17.

Generally, the load elements LOAD11 and LOAD12 require a plurality of power supplies such as a core power supply, an I/O power supply and the like. In the example shown in FIG. 11, the power is fed from the non-insulated power supply DCDC13 to a V1 terminal of the load element LOAD11 and from the non-insulated power supply DCDC 14 to a V2 terminal of the load element load11, while the power is fed from the non-insulated power supply DCDC 15 to a V1 terminal of the load element LOAD12 and from the non-insulated power supply DCDC16 to a V2 terminal of the load element LOAD12, and further the power is fed from the non-insulated power supply DCDC 17 to a V3 terminal of each of the load elements LOAD11 and LOAD12.

When the power consumption at the V3 terminals of the load elements LOAD11 and LOAD12 is small, it is general to supply the power from one non-insulated power supply DCDC17 to both the load elements LOAD11 and LOAD12.

[Patent Document 1] Japanese Patent Application Laid-Open Publication No. 2007-49822

However, when a plurality of the insulated power supplies DCDC11 and DCDC12 are used in combination in a power supply apparatus having such a known IBA feeding power supply configuration, it is unavoidable that variation in start-up of these plural insulated power supplies DCDC11 and DCDC12 occurs.

FIGS. 12(a) through 12(h) are a timing chart showing states of the voltages in the known power supply apparatus shown in FIG. 11. FIG. 12(a) is a diagram showing an intermediate voltage Vi11 outputted from the insulated power supply DCDC11. FIG. 12(b) is a diagram showing an intermediate voltage Vi12 outputted from the insulated power supply DCDC12. FIG. 12(c) is a diagram showing a signal inputted to the V1 terminal of the load element LOAD11. FIG. 12(d) is a diagram showing a signal inputted to the V2 terminal of the load element LOAD1. FIG. 12(e) is a diagram showing a signal inputted to the V3 terminal of the load element LOAD11. FIG. 12(f) is a diagram showing a signal inputted to the V1 terminal of the load element LOAD12. FIG. 12(g) is a diagram showing a signal inputted to the V2 terminal of the load element LOAD12. FIG. 12(h) is a diagram showing a signal inputted to the V3 terminal of the load element LOAD12.

In the case where the load elements LOAD11 and LOAD12 are both load elements that cannot normally operate unless the power sources V1 to V3 are simultaneously applied, if the insulated power supply DCDC11 (time T11; refer to point A in FIG. 12(a)) starts earlier than the insulated power supply DCDC12 (time T12; refer to point B in FIG. 12(b)), power supply from the insulated power supply DCDC11 to the non-insulated power supply DCDC13 and DCDC14 would be done earlier than power supply from the insulated power supply DCDC12 to the non-insulated power supplies DCDC15 to DCDC17, hence, in the load element LOAD11, a voltage is applied to the terminal V3 later than the terminal V1 (refer to point C in FIG. 12(c)) and the terminal V2 (refer to point D in FIG. 12(d)), which would prevent the load element LOAD11 from being able to operate normally.

In other words, in a load element requiring a plurality of power sources, if the plural power sources are not applied simultaneously or in the defined order, the load element would not operate normally.

Further, if inter-element signals are not transmitted simultaneously or in the predetermined order to the plural load elements, hangup or error would occur.

For these reasons, there has been proposed a method of connecting outputs of the plural insulated power supplies DCDC11 and DCDC12 in parallel to simultaneously supply the power to the non-insulated power supplies DCDC13 to DCDC17 in the following stage thereof.

FIG. 13 is a diagram schematically showing another example of configuration of the known power supply apparatus. FIGS. 14(a) and 14(b) are a timing chart showing states of voltages in the known power supply configuration shown in FIG. 13. FIG. 14(a) is a diagram showing a voltage Vi11 outputted from an insulated power supply DCDC11. FIG.

14(b) is a diagram showing a voltage Vi12 outputted from an insulated power source DCDC12.

In the known power supply apparatus shown in FIG. 13, outputs from +Vout terminals of the plural insulated power supplies DCDC11 and DCDC12 are connected in parallel and inputted to +Vin terminals of non-insulated power supplies DCDC13 to DCDC17 in the following stage. Whereby, the power is simultaneously supplied from the plural insulated power supplies DCDC11 and DCDC12 to the non-insulated power supplies DCDC13 to DCDC17 in the following stage.

However, the known method shown in FIG. 13 has a risk that when either one (the insulated power supply DCDC11 in the example shown in FIGS. 14(a) and 14(b)) of the insulated power supplies DCDC11 and DCDC12 starts earlier (refer to a time T11 in FIG. 14(a)), all the loads of the non-insulated power supplies DCDC13 to DCDC17 concentrate on the insulated power supply DCDC11 before the insulated power supply DCDC12 starts (refer to a time T12 in FIG. 14(b)), as a result, the insulated power supply DCDC11 goes down.

SUMMARY OF THE INVENTION

An object of the present invention is to supply stable power to load elements even if a difference in start time generates between a plurality of power supplies when the power is supplied from the plural power supplies to the load elements.

For this purpose, the present invention provides a power supply apparatus converting a primary power supply voltage of electric power supplied from a primary power source into supply voltages and outputting the electric power with each of the supply voltages, comprising a plurality of primary power supplies converting the primary power supply voltage into intermediate voltages, a secondary power supply converting the intermediate voltages converted by the primary power supply into the supply voltages and outputting the supply voltages, and a timing adjuster inputted thereto the power converted into the intermediate voltages from the plural primary power supplies to perform timing adjustment to absorb a difference in start timing between the plural primary power supplies, and causing the secondary power supply to output the supply voltages.

The present invention further provides an electronic apparatus comprising a plurality of load elements operating at supply voltages, a plurality of primary power supplies converting a primary power supply voltage supplied from a primary power source into intermediate voltages, a secondary power supply converting the intermediate voltages converted by the primary power supplies to the supply voltages, and a timing adjuster inputted thereto power converted into the intermediate voltages from the plural primary power supplies to perform timing adjustment to absorb a difference in start timing between the plural primary power supplies, and causing the secondary power supply to output the supply voltages.

The timing adjuster may comprise a plurality of timing signal output sections provided so as to correspond to the plural primary power supplies, respectively, each of the timing signal output sections being able to output a timing signal on the basis of the power inputted from one of the primary power supplies corresponding to itself, and each of the plural timing signal output sections may be supplied driving power from another one of the primary power supplies different from the corresponding primary power supply to operate.

Further, each of the plural timing signal output sections may comprise a combining section combining plural driving power supplied from the plural primary power supplies, the timing signal output section being supplied the driving power combined by the combining section.

Alternatively, the timing adjuster may comprise a plurality of timing signal output sections provided so as to correspond to the plural primary power supplies, respectively, each of the timing signal output sections being able to output a timing signal on the basis of the power inputted from one of the plural primary power supplies corresponding to itself, a plurality of delay sections, provided correspondingly one to each of the plural timing signal output sections, each of the plural delay sections delaying the timing signal input from the corresponding timing signal output section for a time period longer than an output power rise delay time of at least one of the remaining primary power supplies except the primary power supply associated with the corresponding timing signal output section, and an AND section ANDing the timing signals outputted from the plural delay sections.

Each of the timing signal output sections may comprise a voltage comparator comparing an output voltage of a primary power supply corresponding to its own timing signal output section with a reference voltage to output an inhibit signal being able to inhibit the secondary power supply from performing an output operation when the voltage comparator is not conducted.

The apparatus disclosed herein can provide at least any one of the following working effects or advantages:

(1) Even when part of a plurality of the primary power supplies first starts, a plurality of the secondary power supplies can output the supply power, simultaneously or almost simultaneously, which enables stable power supply.

(2) Even when part of a plurality of the primary power supplies starts, it is possible to keep the stopping state of secondary power supplies that correspond a primary power supply not yet started. This can avoid power supply at an uncertain supply voltage, leading to improvement of the reliability.

(3) Since the timing signal output section has a voltage comparator for comparing an output voltage of a primary power supply corresponding to this timing signal output section with a reference voltage, it is possible to certainly stop a secondary power supply corresponding to a primary power supply not yet started by outputting an inhibit signal that can prevent the secondary power supply from performing the outputting operation when this voltage comparator is not conducted.

(4) Since the secondary power supply has a control signal input section for inputting a signal to control start and stop of the secondary power supply and the timing adjuster inputs the timing signal to the control signal input section to cause the secondary power supply to output the supply voltage, it is possible to certainly control the operation of the secondary power supply, which improves the reliability.

DESCRIPTION OF THE PREFERRED EMBODIMENTS

Hereinafter, embodiments of the present invention will be described with reference to the accompanying drawings.

(A) First Embodiment

Figure 1:
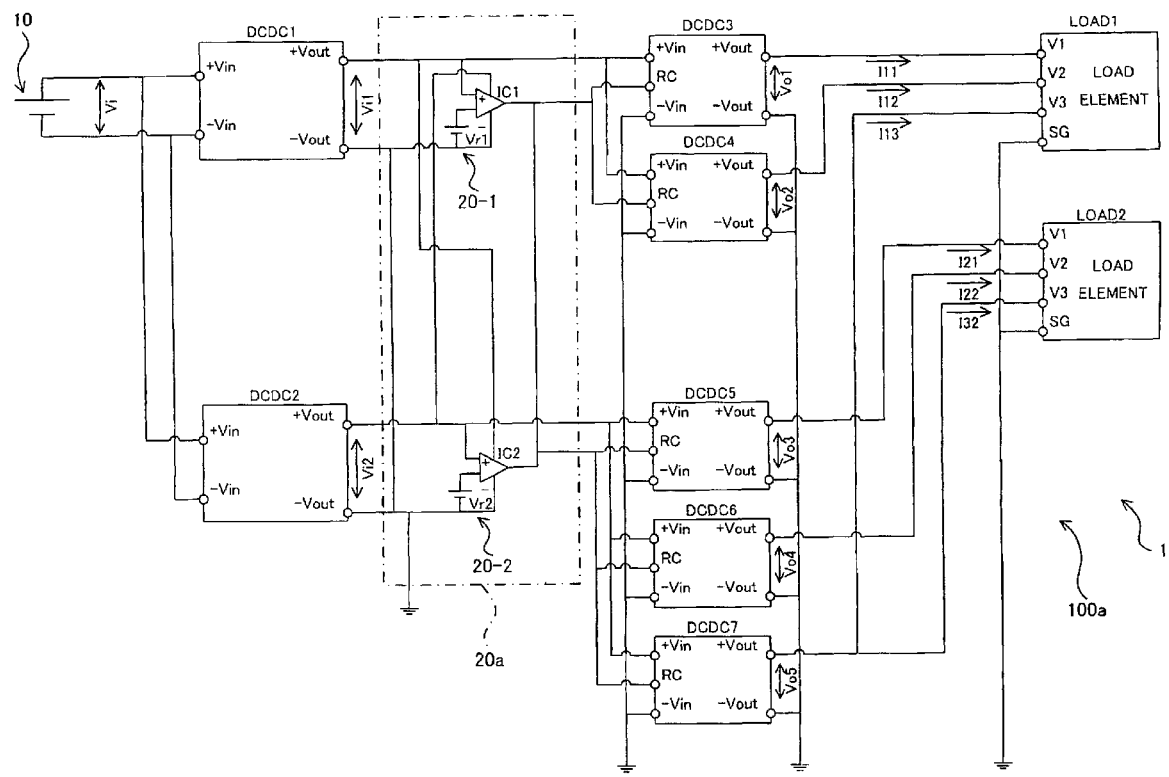
FIG. 1 is a diagram schematically showing configuration of a power supply apparatus according to a first embodiment of this invention.

FIG. 1 is a diagram schematically showing configuration of a power supply apparatus 100a according to a first embodiment of the present invention.

The power supply apparatus 100a according to the first embodiment is provided as a power supply unit of an electronic apparatus 1 such as a computer, for example. The power supply apparatus 100a converts power at a primary power supply voltage (Vi) supplied from a primary power source 10 into supply voltages (Vo1, Vo2, Vo3, Vo4 and Vo5), and outputs (supplies) the supply voltages to load elements LOAD1 and LOAD2 of the electronic apparatus 1. As shown in FIG. 1, the power supply apparatus 100a has insulated power supplies DCDC1 and DCDC2, non-insulated power supplies DCDC3 to DCDC7 and a timing adjuster 20a.

Both the load elements LOAD1 and LOAD2 are elements (load elements) which are supplied electric power by the power supply apparatus 100a to operate, thereby accomplishing any function in the electronic apparatus 1. In the example shown in FIG. 1, each of the load elements LOAD1 and LOAD2 has a V1 terminal, a V2 terminal, a V3 terminal and an SG terminal.

In the first embodiment, power has to be applied almost simultaneously to all the terminals V1, the terminals V2 and the terminals V3 of the load elements LOAD1 and LOAD2 in order to normally operate these load elements LOAD1 and LOAD2.

The primary power source 10 is a direct current input power source for supplying power to the power supply apparatus 100a, supplying the power at a predetermined voltage (primary power supply voltage: Vi) to the power supply apparatus 100a.

Each of the insulated power supply DCDC1 and the insulated power supply DCDC2 is a converter power supply (primary power supply) for converting the voltage Vi of the power inputted from the primary power source 10 to an intermediate voltage (intermediate electric potential) lower than the primary power supply voltage Vi, which is configured as an insulated power supply.

The insulated power supply DCDC1 and the insulated power supply DCDC2 each has a +Vin terminal, a −Vin terminal, a +Vout terminal and a −Vout terminal. The primary power source 10 is connected to the +Vin terminals and the −Vin terminals of the insulated power supply DCDC1 and the insulated power supply DCDC2 to input the power at the primary power supply voltage Vi from the primary power source 10.

In the first embodiment, the insulated power supply DCDC1 converts the voltage Vi of the power inputted from the primary power source 10 to an intermediate voltage Vi1, while the insulated power supply DCDC2 converts the voltage Vi of the power inputted from the primary power source 10 to an intermediate voltage Vi2.

The +Vout terminal of the insulated power supply DCDC1 is connected to the +Vin terminal of each of the non-insulated power supplies DCDC3 and DCDC4, whereby the insulated power supply DCDC1 supplies (feeds) the power at the generated intermediate voltage Vi1 to the +Vin terminals of the non-insulated power supplies DCDC3 and DCDC4. Similarly, the +Vout terminal of the insulated power supply DCDC2 is connected to the +Vin terminal of each of the non-insulated power supplies DCDC5, DCDC6 and DCDC7 to be described later, whereby the insulated power supply DCDC2 supplies (feeds) the power at the generated intermediate voltage Vi2 to the +Vin terminals of the non-insulated power supplies DCDC5, DCDC6 and DCDC7. Incidentally, the +Vout terminal of each of the insulated power supplies DCDC1 and DCDC2 is grounded.

Note that the insulated power supplies DCDC1 and DCDC2 can be accomplished by various known techniques, explanation of their practical circuit configuration, etc. is thus omitted here.

The timing adjuster 20a to be described later is connected in the following stage of the insulated power supply DCDC1, that is, connected to the +Vout terminal and the −Vout terminal which are output terminals of the insulated power supply DCDC1, and in the following stage of the DCDC2, that is, connected to the +Vout terminal and the −Vout terminal which are output terminals of the insulated power supply DCDC2.

The non-insulated power supplies DCDC3, DCDC4, DCDC5, DCDC6 and DCDC7 are a converter power supply (secondary power supply) converting the voltages (intermediate voltages) of the power inputted from the insulated power supply DCDC1 and the insulated power supply DCDC2 into supply voltages (supply electric potentials) lower than the intermediate voltages, each of which is configured as a non-insulated power supply.

Concretely, the non-insulated power supply DCDC3 converts the power at the intermediate voltage Vi1 supplied from the insulated power supply DCDC1 into a supply voltage Vo1. Similarly, the non-insulated power supply DCDC4 converts the power at the intermediate voltage Vi1 supplied from the insulated power supply DCDC1 into a supply voltage Vo2, the non-insulated power supply DCDC5 converts the power at the intermediate voltage Vi2 supplied from the insulated power supply DCDC2 into a supply voltage Vo3, the non-insulated power supply DCDC6 converts the power at the intermediate voltage Vi2 supplied from the insulated power supply DCDC2 into a supply voltage Vo4, and the non-insulated power supply DCDC7 converts the power at the intermediate voltage Vi2 supplied from the insulated power supply DCDC2 into a supply voltage Vo5.

Each of the non-insulated power supply DCDC3 to DCDC7 has a +Vin terminal, a −Vin terminal, an RC terminal, a +Vout terminal and a −Vout terminal, as shown in FIG. 1. The +Vout terminal of the insulated power supply DCDC1 is connected to the +Vin terminal of each of the non-insulated power supplies DCDC3 and DCDC4, the power at the intermediate voltage Vi1 outputted from the +Vout terminal of the insulated power supply DCDC1 is thereby inputted to the +Vin terminals of the non-insulated power supplies DCDC3 and DCDC4.

Similarly, the +Vout terminal of the insulated power supply DCDC2 is connected to the +Vin terminal of each of the non-insulated power supplies DCDC5 to DCDC7, and the power at the intermediate voltage Vi2 outputted from the +Vout terminal of the insulated power supply DCDC2 is inputted to the +Vin terminals of the non-insulated power supplies DCDC5 to DCDC7. The −Vin terminal of each of the non-insulated power supplies DCDC3 to DCDC7 is grounded.

The power at the supply voltage Vo1 converted (generated) by the non-insulated power supply DCDC3 is supplied to the V1 terminal of the load element LOAD1, while the power at the supply voltage Vo2 generated by the non-insulated power supply DCDC4 is supplied to the V2 terminal of the load element LOAD1. Similarly, the power at the supplied voltage Vo3 generated by the non-insulated power supply DCDC5 is supplied to the V1 terminal of the load element LOAD2, the power at the supplied voltage Vo4 generated by the non-insulated power supply DCDC6 is supplied to the V2 terminal of the load element LOAD2, and the power at the supply voltage Vo5 generated by the non-insulated power supply DCDC7 is supplied to the V3 terminal of the load element LOAD1 and LOAD2.

To the RC terminal of each of the non-insulated power supplies DCDC3 to DCDC7, inputted is a timing signal outputted from a corresponding monitoring circuit (timing signal output section) 20-1 and 20-2 in the timing adjuster 20a to be described later.

The RC terminal is a terminal (control signal input section) to which a signal for controlling start/stop of its own non-insulated power supply DCDC3, DCDC4, . . . and DCDC7 is inputted. When a "Low" signal is inputted to the RC terminal, the non-insulated power supply DCDC3, DCDC4, . . . or DCDC7 stops its operation. When a "High" signal is inputted to the RC terminal, the non-insulated power supply DCDC3, DCDC4, . . . or DCDC7 starts and outputs the power.

Namely, when a "High" signal is inputted as a timing signal to the RC terminal from the monitoring circuit 20-1 or 20-2, each of the non-insulated power supplies DCDC3 to DCDC7 outputs the power at the supply voltage Vo1, Vo2, . . . or Vo5.

The control performed by inputting the timing signals to such the RC terminal enables secure control on the operations of the non-insulated power supplies DCDC3 to DCDC7.

In this embodiment, the power consumption of the power inputted to each of the V3 terminals of the load elements LOAD1 and LOAD2 is small and at the same voltage. In the example shown in FIG. 1, the power at the supply voltage Vo5 generated by the non-insulated power supply DCDC7 is supplied to both the V3 terminal of the load element LOAD1 and the V3 terminal of the load element LOAD2, which improves the economy.

The non-insulated power supplies DCDC3, DCDC4 and DCDC7 are arranged in the vicinity of the load element LOAD1. Similarly, the non-insulating power supplies DCDC5 to DCDC7 are arranged in the vicinity of the load element LOAD2.

Namely, the power supply apparatus 100a according to the first embodiment is configured as the POL (Point of Load) system with the non-insulated power supplies DCDC3 to DCDC7 arranged in the vicinity of the load elements LOAD1 and LOAD2, where the non-insulated power supplies DCDC3 to DCDC7 correspond to the POL power supply (POL converter). And, the power supply apparatus 100a according to the first embodiment is configured as an IBA (Intermediate Bus Architecture) power-feeding power supply that converts the power from the primary power source 10 to the lower intermediate voltages Vi1 and Vi2 by means of the insulated power supplies DCDC1 and DCDC2. Employment of such a decentralized power supply system makes it possible to decrease the insulation withstand voltage inside the power supply apparatus 100a and decrease the manufacturing cost of the power supply apparatus 100a.

The timing adjuster (timing signal output section) 20a is disposed in the following stage of the insulated power supplies DCDC1 and DCDC2. The timing adjuster 20a is inputted thereto power converted into the intermediate voltages Vi1 and Vi2 from the plural insulated power supplies DCDC1 and DCDC2, and performs timing adjustment to absorb a difference in start-up timing between these plural insulated power supplies DCDC1 and DCDC2, causing the non-insulated power supplies (secondary power supplies) DCDC3 to DCDC7 to output generated supply voltages. The timing adjuster 20a has the monitoring circuit 20-1 and the monitoring circuit 20-2.

In the following stage of these power supplies DCDC1 and DCDC2, the monitoring circuits 20-1 and 20-2 monitor power inputted from the insulated power supplies DCDC1 and DCDC2. In the example shown in FIG. 1, the monitoring circuit 20-1 is provided in the following stage of the insulated power supply DCDC1 so as to correspond thereto, while the monitoring circuit 20-2 is provided in the following stage of the insulated power supply DCDC2 so as to correspond thereto. Each of the monitoring circuits 20-1 and 20-2 outputs a timing signal on the basis of power inputted from a corresponding insulated power supply DCDC1 or DCDC2.

The monitoring circuit 20-1 has a comparator (voltage comparator) IC1 that compares a voltage (intermediate voltage) Vi1 outputted from the +Vout terminal of the insulated power supply DCDC1 with a predetermined reference voltage Vr1, and outputs a "High" signal (1) when the intermediate voltage Vi1 is higher than the reference voltage Vr1. The output from the comparator IC1 is wired-ORed with the output from the comparator IC2 of the monitoring circuit 20-2 to be described later, and inputted as a timing signal to the RC terminal of each of the non-insulated power supplies DCDC3 to DCDC7.

The monitoring circuit 20-2 has a comparator (voltage comparator) IC2 that compares a voltage (intermediate voltage) Vi2 of the power outputted from the insulated power supply DCDC2 with a predetermined reference voltage Vr2, and outputs a "High" signal (1) when the intermediate voltage Vi2 is higher than the reference voltage Vr2. The output from the comparator IC2 is wired-ORed with the output from the comparator IC1 of the above-mentioned monitoring circuit 20-2.

When both the signals outputted from the comparators IC1 and IC2 are "High" in these monitoring circuits 20-1 and 20-2, "High" (timing signal) is inputted to the RC terminal of each of the non-insulated power supplies DCDC3 to DCDC7 to start these non-insulated power supplies DCDC3 to DCDC7.

In the power supply apparatus 100a of this embodiment, one, for example, 20-1 of the monitoring circuits 20-1 and 20-2 corresponding to the insulated power supply DCDC1 is supplied power from the insulated power supply DCDC2 corresponding to the monitoring circuit 20-2 different from the corresponding insulated power supply DCDC1 to which the monitoring circuit 20-1 is provided (corresponds) to operate, and vice versa.

Concretely, the power outputted from the insulated power supply DCDC1 is supplied as driving power to the comparator IC2 of the monitoring circuit 20-2, while the power outputted from the insulated power supply DCDC2 is supplied as driving power to the comparator IC1 of the monitoring circuit 20-1.

In the power supply apparatus 100a according to the first embodiment, it can be prevented to sent out an unstable signal which results from that a time lag (start-up lag) of the insulated power supply DCDC1 behind start-up of the insulated power supply DCDC2 prevents the comparator IC1 from being able to operate. Conversely, it can be prevented to sent out an unstable signal which results from that a time lag of start-up (start-up lag) of the insulated power supply DCDC2 behind start-up of the insulated power supply DCDC1 prevents the comparator IC2 from being able to operate.

For example, even when the start-up of the insulated power supply DCDC2 delays, the comparator IC2 normally operates because the power is supplied to the comparator IC2 from the insulated power supply DCDC1. Until the insulated power supply DCDC2 starts, a stop signal (Low) is certainly set out from the comparator IC2 and inputted to the RC terminals of the non-insulated power supplies DCDC5 to DCDC7. Therefore, start signals (High) are certainly sent out from the comparators IC1 and IC2 to the non-insulated power supplies DCDC3 to DCDC7 after both the insulated power supplies DCDC1 and DCDC2 start.

In the power supply apparatus 100a according to the first embodiment, the power outputted from the +Vout terminal of the insulated power supply DCDC1 and to be inputted to the non-insulated power supplies DCDC3 and DCDC4 is branched and inputted to a power supply terminal on the plus side (plus-side power supply terminal) of the comparator IC2 of the monitoring circuit 20-2, while the power outputted from the +Vout terminal of the insulated power supply DCDC2 and to be inputted to the non-insulated power supplies DCDC5 to DCDC7 is branched and inputted to a plus-side power supply terminal of the comparator IC1 of the monitoring circuit 20-1. Incidentally, a power supply terminal on the minus side (minus-side power supply terminal) of the comparator IC1 of the monitoring circuit 20-1 and a minus-side power supply terminal of the comparator IC2 of the monitoring circuit 20-2 are grounded.

Figure 2:
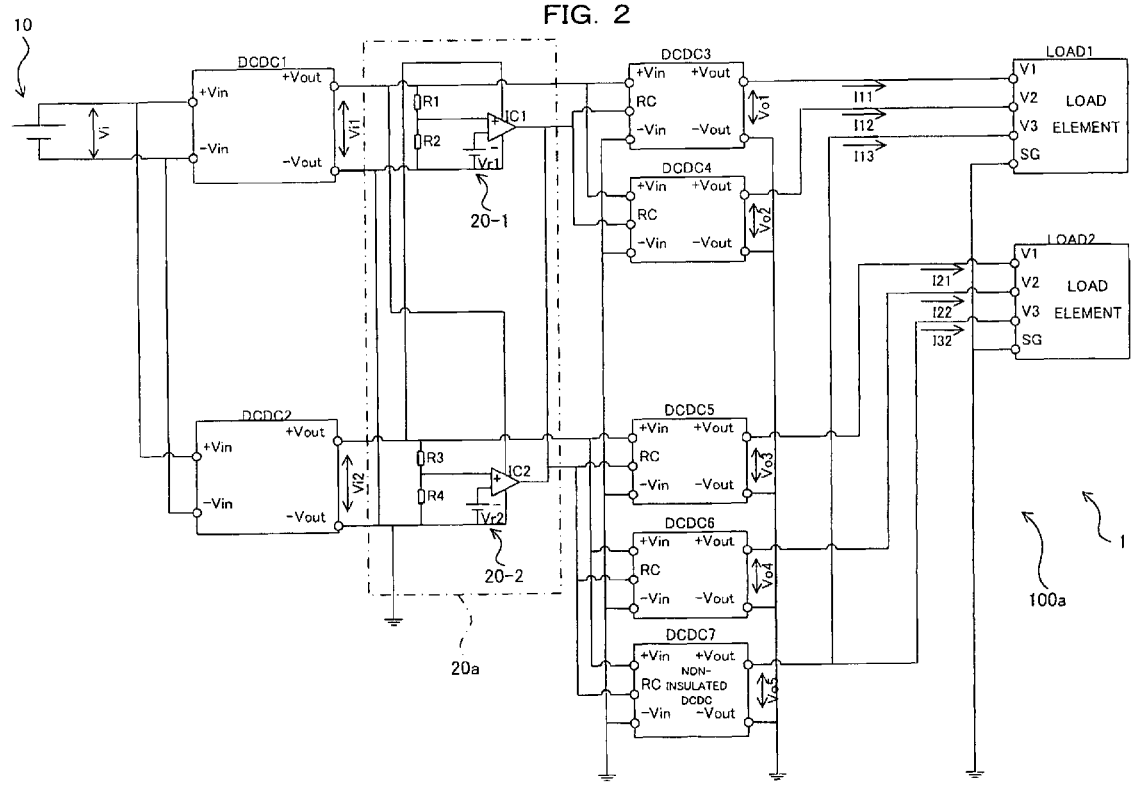
FIG. 2 is a diagram concretely showing circuit configuration of a timing adjuster of the power supply apparatus according to the first embodiment of this invention.

FIG. 2 is a diagram concretely showing circuit configuration of the timing adjuster 20a of the power supply apparatus 100a according to the first embodiment of this invention.

In the example shown in FIG. 2, the monitoring circuit 20-1 has voltage dividing resistors R1 and R2 for dividing the output voltage of the insulated power supply DCDC1. Resistance values of the voltage dividing resistors R1 and R2 are beforehand set.

In the monitoring circuit 20-1, the comparator IC1 outputs a Low (0) signal (Low output) as a timing signal when the divided voltage value of the insulated power supply DCDC1 divided by these voltage dividing resistors R1 and R2 is lower than the reference voltage Vr1, while outputting a High signal (1) when the divided voltage value is higher than the reference voltage Vr1.

Similarly, the monitoring circuit 20-2 has voltage dividing resistors R3 and R4 for dividing the output voltage of the insulated power supply DCDC2, and resistance values of these voltage dividing resistors R3 and R4 are beforehand set.

In the monitoring circuit 20-2, the comparator IC2 outputs a Low signal as a timing signal when a divided voltage value of the insulated power supply DCDC2 divided by these voltage dividing resistors R3 and R4 is lower than the reference voltage Vr2, while outputting a High signal (High output) when the divided voltage value is higher than the reference voltage Vr2.

In other words, when the divided voltage value of the output voltage from the insulated power supplies DCDC1 or DCDC2 becomes higher than the reference voltage Vr1 or Vr2, each of the comparators IC1 and IC2 determines that the output voltage of the insulated power supply DCDC1 or DCDC2 is activated, thereby changing the timing signal to be outputted from "Low" to "High".

In the monitoring circuits 20-1 and 20-2, each of the comparators IC1 and IC2 outputs "Low" (inhibit signal) when not conducted. Each of the non-insulated power supplies DCDC3 to DCDC7 stops the power outputting operation while the Low output is inputted to its RC terminal.

Since the outputs of the comparators IC1 and IC2 are connected to each other (wired-ORed), the RC terminals of the non-insulated power supplies DCDC3 to DCDC7 are "Low" when one of the outputs of the comparators IC1 and IC2 is Low, that is, when the divided voltage value of the output voltage does not satisfy the reference voltage. Whereby, the non-insulated power supplies DCDC3 to DCDC7 keep their stopping state. On the other hand, when the outputs of both the comparators IC1 and IC2 are "High", that is, when the divided voltage values of the output voltages of both the insulated power supplies DCDC1 and DCDC2 exceed the reference values, the RC terminals of the non-insulated power supplies DCDC3 to DCDC7 are "High". Whereby, the non-insulated power supplies DCDC3 to DCDC7 simultaneously start.

Next, states of the voltages at the respective sections in the power supply apparatus 100a with the above configuration according to the first embodiment of this invention will be described with reference to a timing chart shown in FIGS. 3(a) to 3(k).

Figure 3:
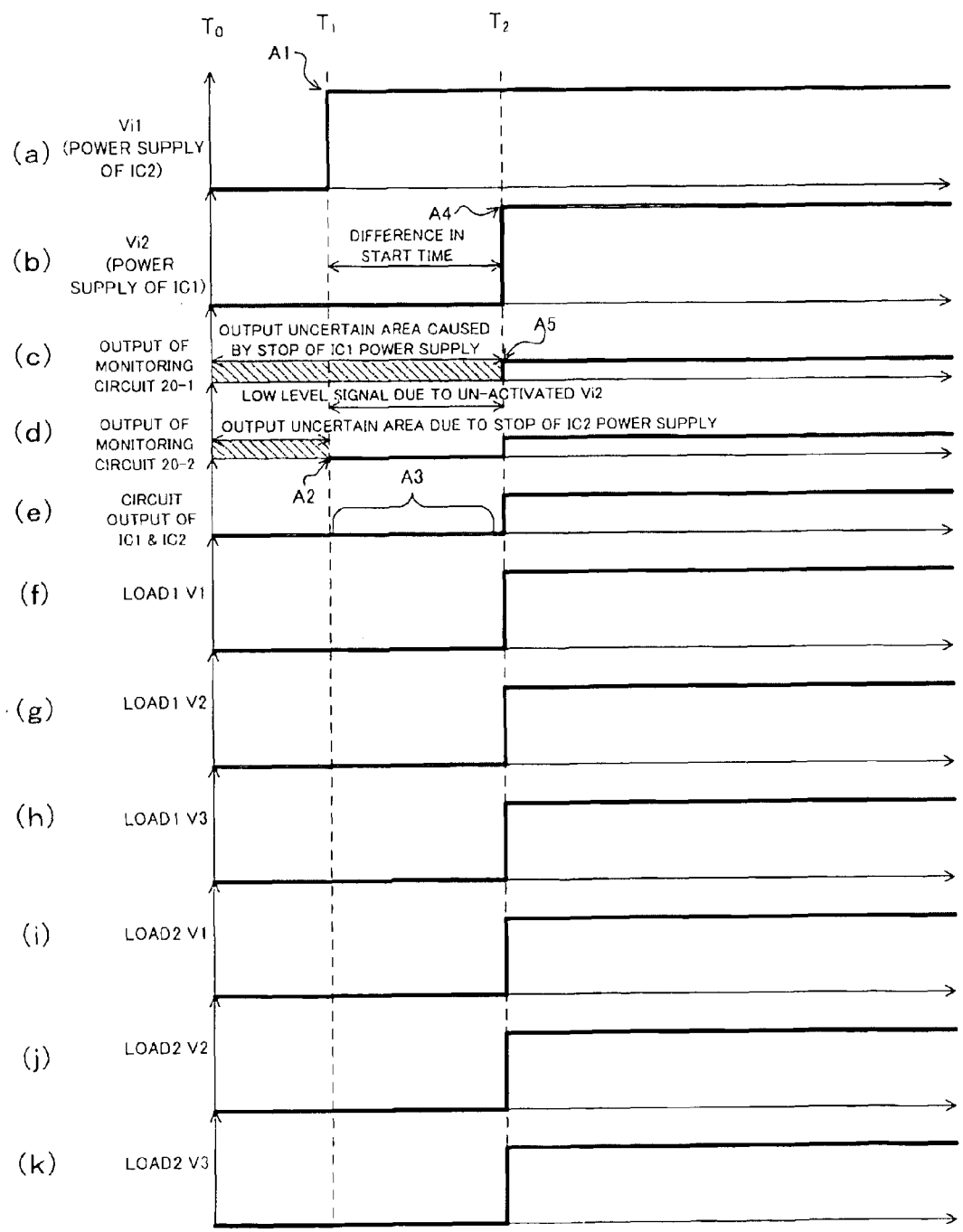
FIGS. 3(a) through 3(k) are a timing chart showing states of voltage in sections in the power supply apparatus according to the first embodiment of this invention.

FIG. 3(a) is a drawing showing an intermediate voltage Vi1 outputted from the insulated power supply DCDC1. FIG. 3(b) is a diagram showing an intermediate voltage Vi2 outputted from the insulated power supply DCDC2. FIG. 3(c) is a diagram showing a timing signal outputted from the monitoring circuit 20-1. FIG. 3(d) is a diagram showing a timing signal outputted from the monitoring circuit 20-2. FIG. 3(e) is a diagram showing a sum of the timing signal outputted from the monitoring circuit 20-1 in FIG. 3(c) and the timing signal outputted from the monitoring circuit 20-2 in FIG. 3(d). FIG. 3(f) is a diagram showing a signal inputted to the V1 terminal of the load element LOAD1. FIG. 3(g) is a diagram showing a signal inputted to the V2 terminal of the load element LOAD1. FIG. 3(h) is a diagram showing a signal inputted to the V3 terminal of the load element LOAD1. FIG. 3(i) is a diagram showing a signal inputted to the V1 terminal of the load element LOAD2. FIG. 3(j) is a diagram showing a signal inputted to the V2 terminal of the load element LOAD2. FIG. 3(k) is a diagram showing a signal inputted to the V3 terminal of the load element LOAD2.

FIGS. 3(a) through 3(k) show an example where the insulated power supply DCDC1 starts (is activated) and initiates its power supply before the insulated power supply DCDC2 starts.

In a state where neither the power supply apparatus 100a starts nor both the insulated power supplies DCDC1 and DCDC2 start (in the stopping state) (refer to time T0 to T1), the power is supplied to neither the comparator IC1 of the monitoring circuit 20-1 nor the comparator IC2 of the monitoring circuit 20-2, hence outputs of both the comparators IC1 and IC2 are in the uncertain state. Accordingly, the power is supplied to none of the non-insulated power supplies DCDC3 to DCDC7 (the stopping state), so that the non-insulated power supplies DCDC3 to DCDC7 are not started. As a result, uncertain power supply from the insulated power supplies DCDC3 to DCDC7 to the load elements LOAD1 and LOAD 2 is not performed.

Incidentally, an area in which the outputs of the comparators IC1 and IC2 are uncertain is designated by slanted lines in FIGS. 3(c) and 3(d).

When the power supply apparatus 100a starts, and the insulated power supply DCDC1 first starts and its output voltage is activated (time T1; refer to point A1 in FIG. 3(a)), the power is supplied from the insulated power supply DCDC1 to the comparator IC2 of the monitoring circuit 20-2, the comparator IC2 thereby starts its operation. At this point of time (time T1), the insulated power supply DCDC2 is in the stopping state, hence the output thereof is uncertain because the comparator IC1 does not yet operate. Accordingly, the comparator IC2 keeps outputting "Low" (refer to point A2 in FIG. 3(d)).

During this (time T1 to T2), the insulated power supply DCDC2 is in the stopping state, hence the power supply to the comparator IC1 is not performed. Thus, even when the output of the monitoring circuit 20-1 is in the uncertain state (refer to FIG. 3(c)), the output of the comparator IC2 remains "Low" (refer to FIG. 3(d)). Accordingly, the RC terminals of the non-insulated power supplies DCDC3 to DCDC7 are kept "Low" (refer to AS in FIG. 3(e)), hence these non-insulated power supplies DCDC3 to DCDC7 keep their stopping state.

With start of the insulated power supply DCDC1, power generated by the insulated power supply DCDC1 is supplied to the +Vin terminals of the non-insulated power supplies DCDC3 and DCDC4. However, the RC terminals of the non-insulated power supplies DCDC3 to DCDC7 are kept "Low", hence the non-insulated power supplies DCDC3 to DCDC7 keep their stopping state. Whereby, the V1 terminal to V3 terminal of the load elements LOAD1 and LOAD2 remain "Low" (refer to FIGS. 3(f) to 3(k)).

When the non-insulated power supply DCDC2 starts (time T2; refer to point A4 in FIG. 3(b)), the power is supplied from the non-insulated power supply DCDC2 to the comparator IC1, the comparator IC1 thereby starts its operation (refer to point A5 in FIG. 3(c)). Since the output voltage of both the non-insulated power supplies DCDC1 and DCDC2 are already activated at this point of time, the outputs of both the comparator IC1 and the comparator IC2 are "High" (refer to FIG. 3(d)), a signal to be inputted to the RC terminals of the non-insulated power supplies DCDC3 to DCDC7 is changed from "Low" to "High", the non-insulated power supplies DCDC3 to DCDC7 thereby simultaneously start.

As this, the power is supplied to the V1 terminals, the V2 terminals and the V3 terminals of the load element LOAD1 and the load element LOAD2, almost simultaneously (refer to FIGS. 3(f) to 3(k)).

In the power supply apparatus 100a according to the first embodiment of this invention, in a state where the power supply apparatus 100a does not yet start and both the insulated power supplies DCDC1 and DCDC2 do not yet start (in the stopping state) as well, the power is not at all supplied to the non-insulated power supplies DCDC3 to DCDC7 (in the stopping state) hence these non-insulated power supplies DCDC3 to DCDC 7 are not started. Accordingly, uncertain power supply from the non-insulated power supplies DCDC3 to DCDC7 to the load elements LOAD1 and LOAD2 is not performed, which improves the reliability.

Since the outputs of the comparators IC1 and IC2 are connected to each other (wired-ORed), the RC terminals of the non-insulated power supplies DCDC3 to DCDC7 remain "Low" when either one of the outputs of the comparators IC1 and IC2 is "Low", that is, when the divided voltage value of the output voltage does not satisfy the reference value. Accordingly, it is possible to keep, with certainty, the stopping state of the non-insulated power supplies DCDC3 to DCDC7.

Each of the monitoring circuits 20-1 and 20-2 corresponding to the insulated power supply DCDC1 or DCDC2 is supplied the power from the insulated power supply DCDC2 or DCDC1 of the other monitoring circuit 20-2 or 20-1 to operate. Therefore, even in a state where only one of the insulated power supplies (for example, the insulated power supply DCDC1) first starts, the power is supplied from the insulated power supply DCDC (for example, insulated power supply DCDC1) that has already started first to the comparator IC2 of the monitoring circuit 20-2 corresponding to the other insulated power supply DCDC (for example, the insulated power supply DCDC2) that does not yet start, hence the output of the monitoring circuit 20-2 can be kept "Low", with certainty. As a result, the stopping state of the non-insulated power supplies DCDC3 to DCDC7 is kept so that uncertain power supply from the non-insulated power supplies DCDC3 to DCDC7 to the load elements LOAD1 and LOAD2 is not performed.

In other words, timing adjustment to absorb a difference in the start timing between the plural primary power supplies (insulated power supplies DCDC1 and DCDC2) is performed to allow the plural secondary power supplies (non-insulated power supplies DCDC3 to DCDC7) to simultaneously output the supply voltages. Whereby, even when part of the primary power supplies starts first among the plural primary power supplies, the plural secondary power supplies can output the supply voltages, simultaneously or almost simultaneously, which enables stable power supply.

In each of the monitoring circuit 20-1 and 20-2, the comparator IC1 or IC2 outputs "Low" (inhibit signal) when not being conducted. In a state where the "Low" outputs are inputted to the RC terminals of the non-insulated power supplies DCDC3 to DCDC7 from the comparators IC1 and IC2, it is possible to stop the non-insulated power supplies DCDC3 to DCDC7 from performing the power outputting operation, which improves the reliability.

When the outputs of both the comparator IC1 and the comparator IC2 are "High", that is, when the divided voltage values of the output voltages of both the insulated power supplies DCDC1 and DCDC2 exceed the respective reference values, the RC terminals of the non-insulated power supplies DCDC3 to DCDC7 become "High", the non-insulated power supplies DCDC3 to DCDC7 thereby start up simultaneously to supply the power to the V1 terminals, the V2 terminals and the V3 terminals of the load elements LOAD1 and LOAD2. Even when a difference in the start time is generated between the plural insulated power supplies DCDC1 and DCDC2, it is possible to start the non-insulated power supplies DCDC3 to DCDC7 all together at the same timing to supply stable power to the load elements LOAD1 and LOAD2.

Whereby, it becomes possible to efficiently distribute the power of the non-insulated power supplies to the load elements without wastefully decentralizing the non-insulated power supplies DCDC3 to DCDC7 due to a difference in timing of the start-up between the plural insulated power supplies DCDC1 and DCDC2.

Likewise, with respect to the insulated power supplies DCDC1 and DCDC1 supplying the power to the non-insulated power supplies DCDC3 to DCDC7, it is possible to efficiently distribute the power to the non-insulated power supplies DCDC3 to DCDC7 under the insulated power supplies DCDC1 and DCDC2.

Further, it becomes unnecessary to concern for variations in delay of the start time of the insulated power supplies DCDC1 and DCDC2, which enables use of inexpensive power supply to reduce the manufacturing cost.

Still further, since an unstable timing signal is not outputted from the monitoring circuits 20-1 and 20-2 unless the power is outputted simultaneously from both the monitoring circuits 20-1 and 20-2, stable power supply to the load elements LOAD1 and LOAD2 is possible, which improves the reliability.

The insulated power supplies DCDC1 and DCDC2 for converting the voltage of the primary power source 10 into lower voltages (intermediate voltages, intermediate electric potentials) are disposed in the preceding stage of the small-sized, non-insulated power supplies (POL converter) DCDC3 to DCDC7. Whereby, it is possible to reduce the size of the POL power supply and secure the insulation inside the apparatus.

(B) Second Embodiment

Figure 4:
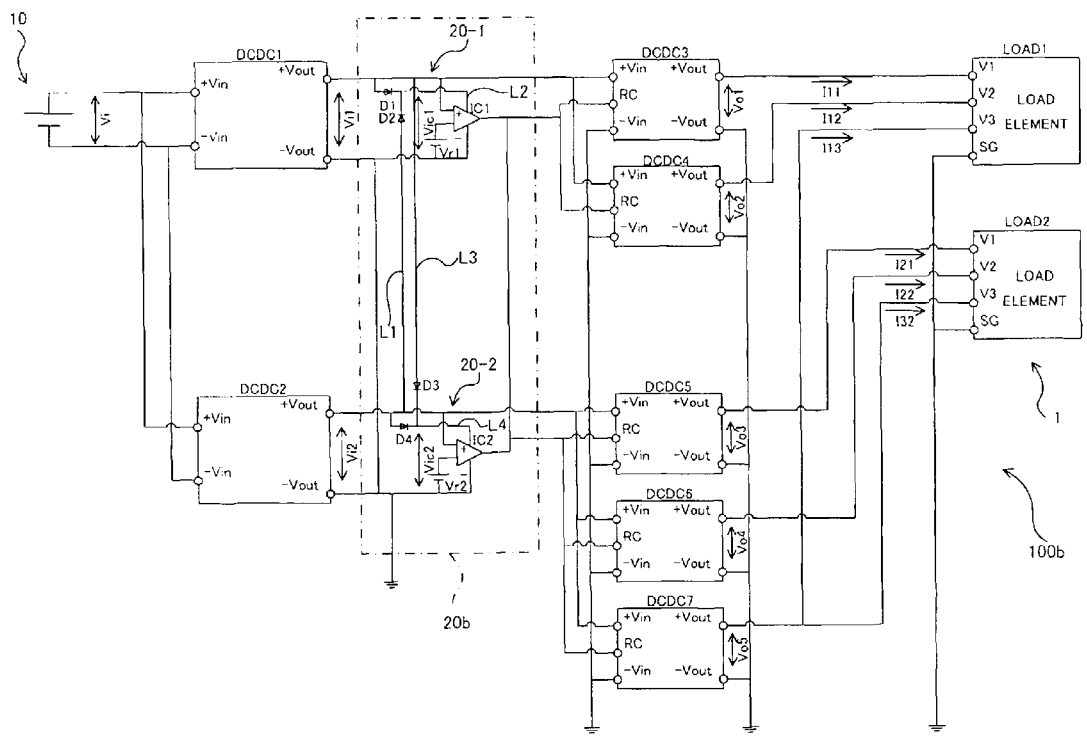
FIG. 4 is a diagram schematically showing configuration of a power supply apparatus according to a second embodiment of this invention.
Figure 5:
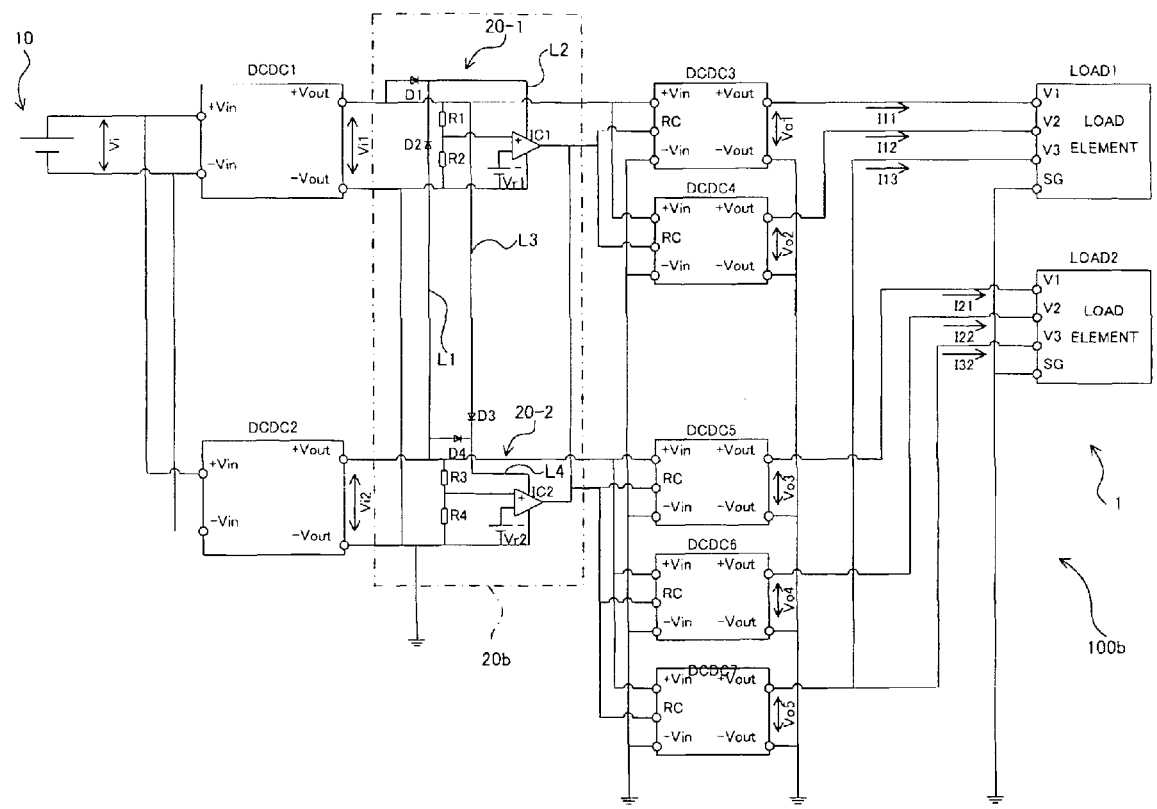
FIG. 5 is a diagram concretely showing circuit configuration of a timing adjuster of the power supply apparatus according to the second embodiment of this invention.

FIG. 4 is a diagram schematically showing configuration of a power supply apparatus 100b according to a second embodiment of this invention. FIG. 5 is a diagram concretely showing circuit configuration of a timing adjuster 20b of the power supply apparatus 100b.

Like the power supply apparatus 100a according to the first embodiment, the power supply apparatus 100b according to the second embodiment is provided as a power supply unit to an electronic apparatus 1 such as a computer or the like, for example. The power supply apparatus 100b converts power at the primary power supply voltage (Vi) supplied from a primary power source 10 to supply voltages (Vo1, Vo2, Vo3, Vo4, Vo5) and outputs (supplies) the voltages to load elements LOAD1 and LOAD2 of the electronic apparatus 1, the power supply apparatus 100b being configured in the POL system and as an IBA feeding power supply.

As shown in FIGS. 4 and 5, the power supply apparatus 100b according to the second embodiment has insulated power supplies DCDC1 and DCDC2, non-insulated power supplies DCDC3 to DCDC7 and the timing adjuster 20b.

Incidentally, like reference characters in the drawings designate like or corresponding parts, detailed descriptions of which are thus omitted.

Like the timing adjuster 20a in the first embodiment, the timing adjuster 20b of the power supply apparatus 100b according to the second embodiment is disposed in the following stage (in the downstream, on the output side) of the insulated power supplies DCDC1 and DCDC2, and connected to the rear thereof, that is, to a +Vout terminal and a −Vout terminal thereof which are output terminals of the insulated power supply DCDC1, and to the rear of the insulated power supply DCDC2, that is, to a +Vout terminal and a −Vout terminal thereof which are output terminals of the insulated power supply DCDC2.

The timing adjuster 20b is inputted power converted into intermediate voltages Vi1 and Vi2 from the plural insulated power supplies DCDC1 and DCDC2 to perform timing adjustment to absorb a difference in start timing between the plural insulated power supplies DCDC1 and DCDC2, thereby causing the non-insulated power supplies (secondary power supply) DCDC3 to DCDC7 to output generated supply voltages.

In the timing adjuster 20b, a monitoring circuit 20-1 is disposed in the following stage of the insulated power supply DCDC1 so as to correspond thereto, and a monitoring circuit 20-2 is disposed in the following stage of the insulated power supply DCDC2 so as to correspond thereto.

In the power supply apparatus 100b according to the second embodiment, the timing adjuster 20b has the monitoring circuit 20-1 and the monitoring circuit 20-2.

These monitoring circuits 20-1 and 20-2 are supplied driving power from a plurality of the insulated power supplies DCDC1 and DCDC2 to operate. To a comparator IC1 of the monitoring circuit 20-1 and a comparator IC2 of the monitoring circuit 20-2, supplied are power outputted from the insulated power supply DCDC1 and power outputted from the insulated power supply DCDC2 as driving power, respectively.

In concrete, as shown in FIGS. 4 and 5, in the timing adjuster 20b, power outputted from a +Vout terminal of the insulated power supply DCDC1 to be inputted to the non-insulated power supplies DCDC3 and DCDC4 is branched as a power feed line L2, and inputted to the power supply terminal on the plus side (plus-side power supply terminal) of the comparator IC1 of the monitoring circuit 20-1, while power outputted from a +Vout terminal of the insulated power supply DCDC2 to be inputted to the non-insulated power supplies DCDC5 to DCDC7 is branched as a power feed line L1 and inputted to a plus-side power supply terminal of the comparator IC1 of the monitoring circuit 20-1 via a diode D2, the power feed line L2 being connected to the power feed line L1.

On the power feed line L2, a diode D1 is disposed at a position closer to the insulated power supply DCDC1 than a position of the connection to the power feed line L1 in order to prevent reverse current of the power supplied through the power feed line L1 toward the insulated power supply DCDC1.

Likewise, in the timing adjuster 20b, power outputted from a +Vout terminal of the insulated power supply DCDC1 to be inputted to the non-insulated power supplies DCDC3 and DCDC4 is branched as a power feed line L3 and inputted to a plus-side power supply terminal of the comparator IC2 of the monitoring circuit 20-2 via a diode D3, while power outputted from a +Vout terminal of the insulated power supply DCDC2 to be inputted to the non-insulated power supplies DCDC3 to DCDC7 is branched as a power feed line L4 and is inputted to the power supply terminal on the plus side (plus-side power supply terminal) of the comparator IC2 of the monitoring circuit 20-2, the power feed line L3 being connected to the power feed line L4.

On the power feed line L4, a diode D4 is disposed at a position closer to the insulated power supply DCDC2 than the connection to the power supply line L3 in order to prevent reverse current of the power supplied through the power feed line L3 toward the insulated power supply DCDC2.

In other words, the two sorts of power (driving power) generated by the insulated power supply DCDC1 and the insulated power supply DCDC2 are combined by a diode OR formed by the diode D1 and the diode D2, supplied to the comparator IC1 of the monitoring circuit 20-1. These diodes D1 and D2 together function as a combining section that combines the two sorts of driving power supplied from the plural insulated power supplies DCDC1 and DCDC2.

Likewise, the two sorts of power generated by the insulated power supply DCDC1 and the insulated power supply DCDC2 are combined by a diode OR formed by the diode D3 and the diode D4, and supplied to the comparator IC2 of the monitoring circuit 20-2. These diodes D3 and D4 together function as a combining section that combines the two sorts of driving power supplied from the plural insulated power supplies DCDC1 and DCDC2.

In the power supply apparatus 100b according to the second embodiment, the power outputted from the +Vout terminal of the insulated power supply DCDC2 is inputted to the plus-side power supply terminal of the comparator IC1 of the monitoring circuit 20-1 via the diode D2. Whereby, it is possible to inhibit an uncertain signal resulting from that the comparator IC1 cannot operate due to start delay of the insulated power supply DCDC1 from being outputted. Likewise, the power outputted from the +Vout terminal of the insulated power supply DCDC2 is inputted to the plus-side power supply terminal of the comparator IC1 of the monitoring circuit 20-1 via the diode D3. Whereby, it is possible to inhibit an uncertain signal resulting from that the comparator IC1 cannot operate due to start delay of the insulated power supply DCDC2 from being outputted.

The outputs of the comparators IC1 and IC2 are connected to each other, and inputted to the RC terminals of the non-insulated power supplies DCDC3 to DCDC7. When, the two sort of power outputted from these plural comparators IC1 and IC2 become both "High", the RC terminals of the non-insulated power supplies DCDC3 to DCDC7 become "High", whereby the non-insulated power supplies DCDC3 to DCDC7 all together simultaneously start.

Next, states of voltages at the respective sections in the power supply apparatus 100b configured as above according to the second embodiment of this invention will be described with reference to a timing chart shown in FIGS. 6(*a*) through 6(*m*).

Figure 6:
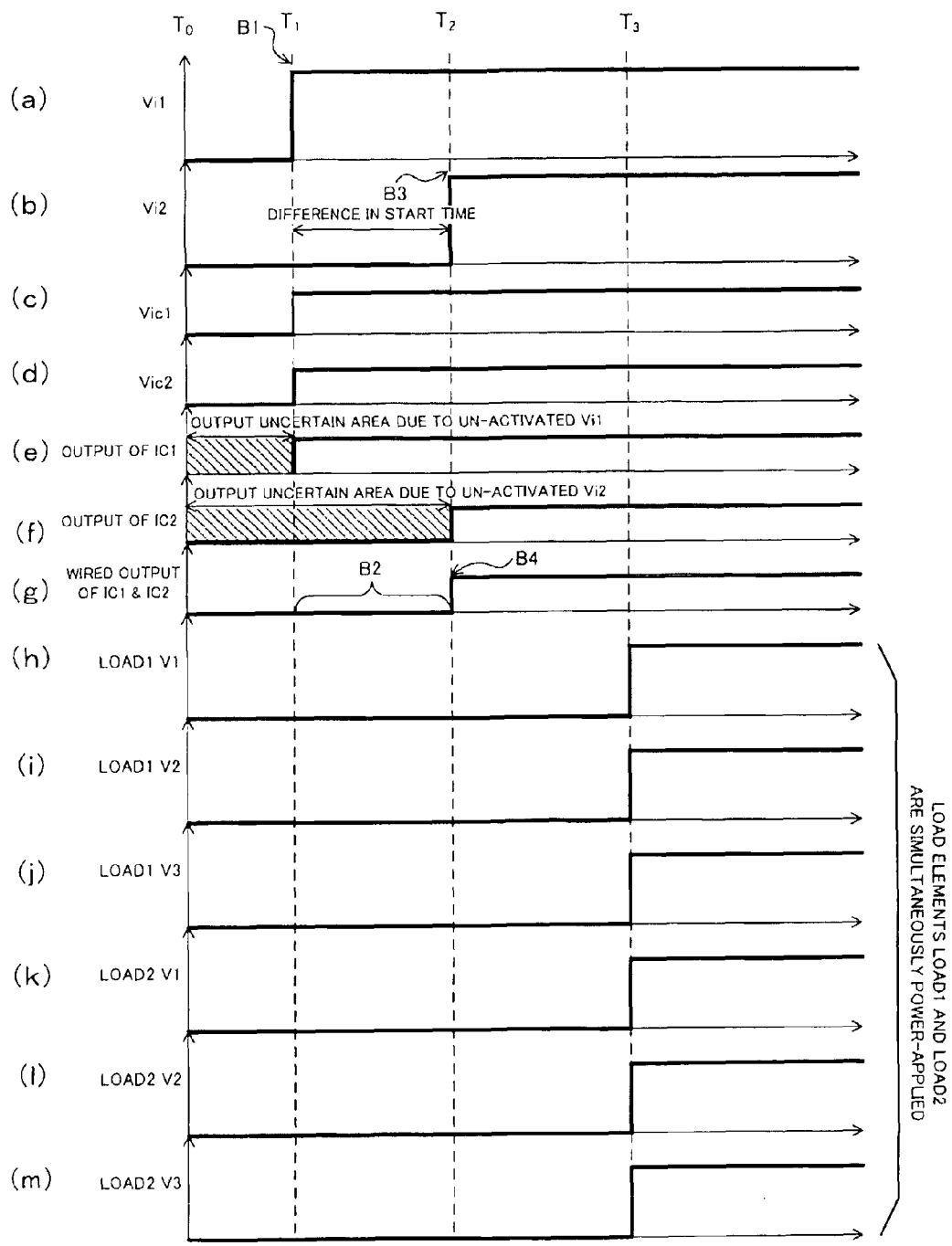
FIGS. 6(a) through 6(m) are a timing chart showing states of voltage at sections in the power supply apparatus according to the second embodiment of this invention.

FIG. 6(*a*) is a diagram showing an intermediate voltage Vi1 outputted from the insulated power supply DCDC1. FIG. 6(*b*) is a diagram showing an intermediate voltage Vi2 outputted from the insulated power supply DCDC2. FIG. 6(*c*) is a diagram showing a voltage Vic1 applied to the comparator IC1 of the monitoring circuit 20-1. FIG. 6(*d*) is a diagram showing a voltage Vic2 applied to the comparator IC2 of the monitoring circuit 20-2. FIG. 6(*e*) is a diagram showing a timing signal outputted from the comparator IC1 of the monitoring circuit 20-1. FIG. 6(*f*) is a diagram showing a signal outputted from the comparator IC2 of the monitoring circuit 20-2. FIG. 6(*g*) is a diagram showing a wired-output of the timing signal outputted from the comparator IC1 of the monitoring circuit 20-1 in FIG. 6(*e*) and the timing signal outputted from the comparator IC2 of the monitoring circuit 20-2 in FIG. 6(*f*). FIG. 6(*h*) is a diagram showing a signal inputted to a V1 terminal of the load element LOAD1. FIG. 6(*i*) is a diagram showing a signal inputted to a V2 terminal of the load element LOAD1. FIG. 6(*j*) is a diagram showing a signal inputted to a V3 terminal of the load element LOAD1. FIG. 6(*k*) is a diagram showing a signal inputted to a V1 terminal of the load element LOAD2. FIG. 6(*l*) is a diagram showing a signal inputted to a V2 terminal of the load element LOAD2. FIG. 6(*m*) is a diagram showing a signal inputted to a V3 terminal of the load element LOAD2.

FIGS. 6(*a*) through 6(*m*) show an example where the insulated power supply DCDC1 starts (is activated) and initiates power supply before the insulated power supply DCDC2 starts.

In a state where the power supply apparatus 100b does not yet start and both the insulated power supplies DCDC1 and DCDC2 do not yet start (stopping state) as well (refer to time T0 to T1), power is supplied to neither the comparator IC1 of the monitoring circuit 20-1 nor the comparator IC2 of the monitoring circuit 20-2, hence outputs of both the comparators IC1 and IC2 are uncertain. Power is not supplied to the non-insulated power supplies DCDC3 to DCDC7 (stopping state), hence the non-insulated power supplies DCDC3 to DCDC7 are not started. Accordingly, uncertain power supply from the non-insulated power supplies DCDC3 to DCDC7 to the load elements LOAD1 and LOAD2 is not performed.

In FIGS. 6(*e*) and 6(*f*), an area where the outputs of the comparators IC1 and IC2 are uncertain is designated by slanted lines.

When the power supply apparatus 100b starts, and the insulated power supply DCDC1 first starts and its output voltage is activated (time T1; refer to point B1 in FIG. 6(*a*)), the power is supplied from the insulated power supply DCDC1 to the comparator IC1 of the monitoring circuit 20-1 via the diode D1, at the same time, the power is supplied to the comparator IC2 of the monitoring circuit 20-2 via the diode D3 (refer to FIGS. 6(*c*) and 6(*d*)), then these comparators IC1 and IC2 initiate their operation (refer to FIGS. 6(*e*) and 6(*f*)).

At this point of time (time T1), the output of the comparator IC1 is kept "High" because the insulated power supply DCDC2 runs, while the output of the comparator IC2 is kept "Low" because the insulated power supply DCDC2 is in the stopping state. Namely, since the power is supplied to the comparator IC2 from the insulated power supply DCDC1, the comparator IC2 normally operates, hence a stop signal is certainly sent out from the comparator IC2 (keeping "Low") even while the insulated power supply DCDC2 does not yet start (time T1 to T2).

Since the outputs of the comparators IC1 and IC2 are connected to each other, the RC terminals of the non-insulated power supplies DCDC3 to DCDC7 remain "Low" to keep their stopping state while the comparator IC2 is kept "Low" (refer to B2 in FIG. 6(*g*)).

With the start of the insulated power supply DCDC1, the power generated by the insulated power supply DCDC1 is supplied to the +Vin terminals of the non-insulated power supplies DCDC3 and DCDC4, but the non-insulated power supplies DCDC3 to DCDC7 keep their stopping state because the RC terminals of the non-insulated power supplies DCDC3 to DCDC7 are all kept "Low". Accordingly, the V1 terminal to the V3 terminal of each of the load elements LOAD1 and LOAD2 are kept "Low" (refer to FIGS. 6(*h*) to 6(*m*)).

Thereafter, when the non-insulated power supply DCDC2 starts and its output voltage is activated (time T2; refer to point B3 in FIG. 6(*b*)), the comparator IC2 changes from "Low" to "High" (refer to point B4 in FIG. 6(*f*)), and the outputs of both the comparator IC1 and the comparator IC2 become "High" (refer to point B5 in FIG. 6(*f*)). Whereby, a signal to be inputted to the RC terminals of the non-insulated power supplies DCDC3 to DCDC7 changes from "Low" to "High", so that the non-insulated power supplies DCDC3 to DCDC7 simultaneously start (refer to FIGS. 6(h) to 6(m)).

As above, the power is supplied almost simultaneously to the V1 terminals, the V2 terminals and the V3 terminals of the load element LOAD1 and the load element LOAD2.

The power supply apparatus 100b according to the second embodiment of this invention not only can provide the same working effects as the above-mentioned first embodiment, but also can be applied to a power supply apparatus having three or more insulated power supplies DCDC (primary power supply).

When the power supply apparatus has three or more insulated power supplies DCDC, it is desirable to combine (at least two or more) sorts of power outputted from the insulated power supplies by a diode OR, and supply the combined power to a monitoring circuit in the following stage of these insulated power supplies DCDC.

(B) Third Embodiment

Figure 7:
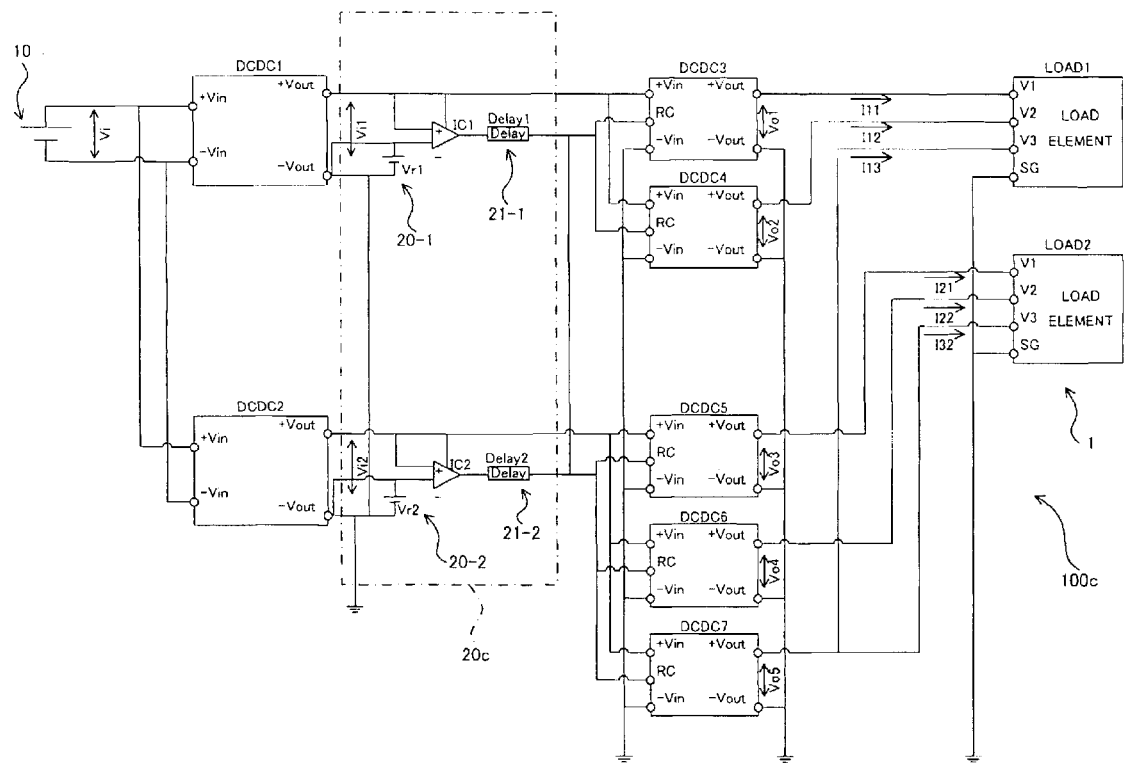
FIG. 7 is a diagram schematically showing configuration of a power supply apparatus according to a third embodiment of this invention.

FIG. 7 is a diagram schematically showing configuration of a power supply apparatus 100c according to a third embodiment of the present invention.

Like the power supply apparatus 100a according to the first embodiment, the power supply apparatus 100c according to the third embodiment is provided as a power supply unit to an electronic apparatus such as a computer or the like, for example. The power supply apparatus 100c converts power at the primary power supply voltage (Vi) supplied from a primary power source 10 into supply voltages (Vo1, Vo2, Vo3, Vo4, Vo5) and outputs (supplies) the voltages to load elements LOAD1 and LOAD2, the power supply apparatus 100c being configured in the POL system, and configured as an IBA feeding power supply.

Figure 8:
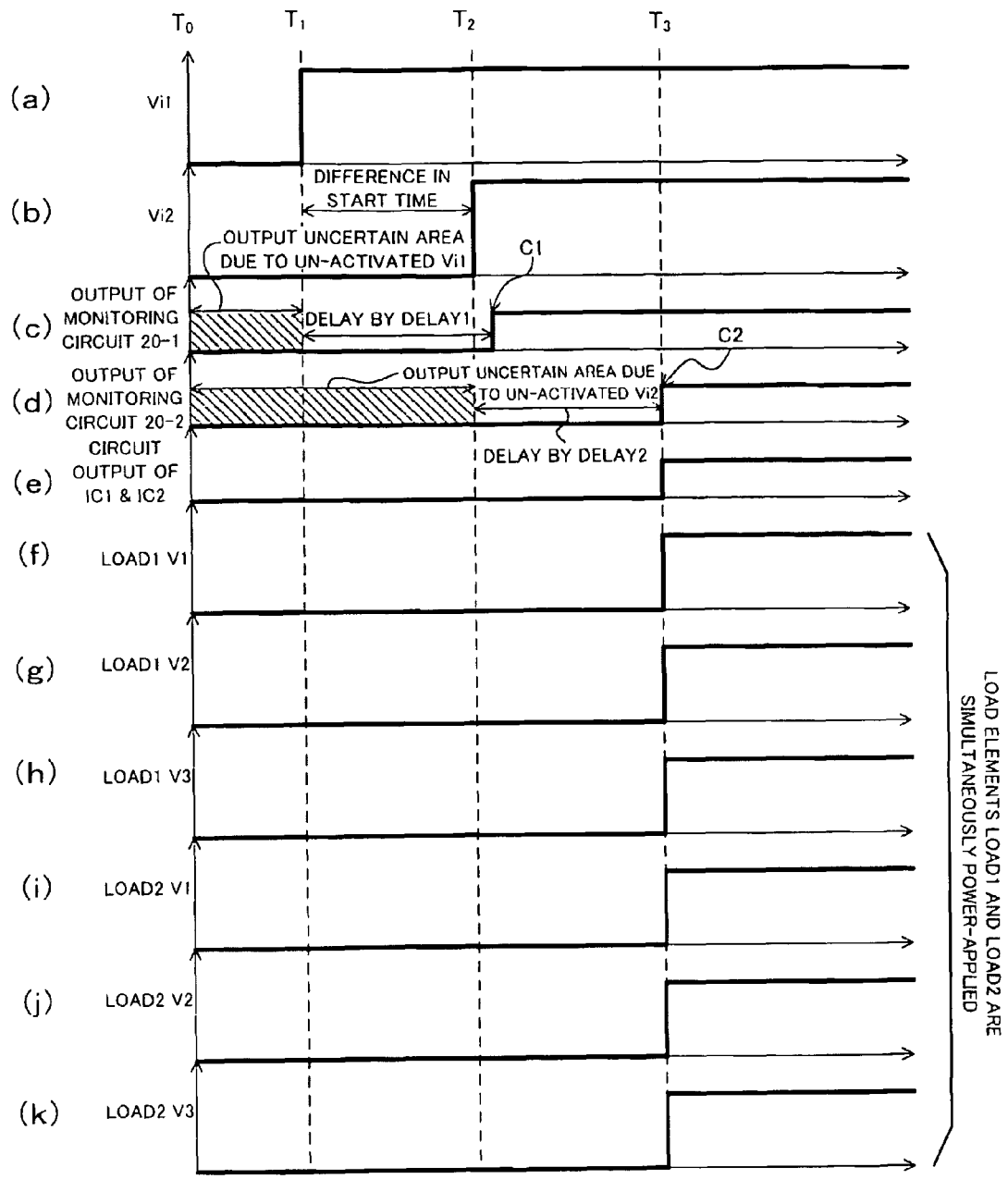
FIGS. 8(a) through 8(k) are a timing chart showing states of voltage at sections in the power supply apparatus according to the third embodiment of this invention.

As shown in FIGS. 7 and 8, the power supply apparatus 100c according to the third embodiment has insulated power supplies DCDC1 and DCDC2, non-insulated power supplies DCDC3 to DCDC7 and a timing adjuster 20c.

Incidentally, like reference characters in the drawings designate like or corresponding parts, detailed descriptions of which are thus omitted.

Like the timing adjuster 20a according to the first embodiment, the timing adjuster 20c of the power supply apparatus 100c according to the third embodiment is disposed in the following stage (in the downstream, on the output side) of the insulated power supplies DCDC1 and DCDC2, and is connected to the rear of the insulated power supply DCDC1, that is, to a +Vout terminal and a −Vout terminal which are output-side terminals of the insulated power supply DCDC1, and to the rear of the insulated power supply DCDC2, that is, to a +Vout terminal and a −Vout terminal which are output-side terminals of the insulated power supply DCDC2.

The timing adjuster 20c is inputted power converted into intermediate electric potentials Vi1 and Vi2 from the plural insulated power supplies DCDC1 and DCDC2, and performs timing adjustment to absorb a difference in start timing between the plural insulated power supplies DCDC1 and DCDC2, thereby to cause the non-insulated power supplies (secondary power supply) DCDC3 to DCDC7 to output generated supply voltages.

In the timing adjuster 20c, a monitoring circuit 20-1 is disposed in the following stage of the insulated power supply DCDC1 so as to correspond thereto, and a monitoring circuit 20-2 is disposed in the following stage of the insulated power supply DCDC2 so as to correspond thereto.

In the power supply apparatus 100c according to the third embodiment, the timing adjuster 20c has the monitoring circuits 20-1 and 20-2 and delay sections 21-1 and 21-2.

Each of the delay sections 21-1 and 21-2 delays an inputted signal by a predetermined period of time (delay time) and outputs the signal. The delay section 21-1 corresponds to the insulated power supply DCDC1 and the monitoring circuit 20-1, while the delay section 21-2 corresponds to the insulated power supply DCDC2 and the monitoring circuit 20-2. In other words, the delay sections 21-1 and 21-2 are provided so as to correspond to the plural insulated power supplies DCDC1 and DCDC2, respectively.

The delay section 21-1 delays a timing signal inputted from the corresponding monitoring circuit 20-1 by a predetermined delay time (Delay1) and outputs the signal. This delay time by the delay section 21-1 is a time period longer than an output power rise delay time of the insulated power supply DCDC2, which is a primary power supply different from the corresponding insulated power supply DCDC1, between the plural (two in the example shown in FIGS. 7 and 8) insulated power supplies DCDC1 and DCDC2 provided in the power supply apparatus 100c according to the third embodiment.

Likewise, the delay section 21-2 delays a timing signal inputted from the corresponding monitoring circuit 20-2 by a predetermined delay time (Delay2) and outputs the signal. The delay time by the delay section 21-2 is a time period longer than a time period (hereinafter, referred to as an output power rise delay time) required until the insulated power supply DCDC1, which is a primary power supply different from the corresponding insulated power supply DCDC2, between a plurality (two in the example shown in FIG. 7) of the insulated power supplies DCDC1 and DCDC2 provided in the power supply apparatus 100c according to the third embodiment, starts up and initiates outputting of the power.

Namely, the delay sections 21-1 and 21-2 are provided so as to correspond to the plural insulated power supplies DCDC1 and DCDC2, respectively. Each of the delay sections 21-1 and 21-2 can delay a timing signal inputted from the corresponding monitoring circuit by a time period equal to or longer than an output power rise delay time of the other insulated power supply DCDC, which differs from the corresponding insulated power supply DCDC, between the plural insulated power supplies DCDC1 and DCDC2, and output the signal.

The output power rise delay time of each of the insulated power supply DCDC1 or DCDC2 varies according to characteristics of the insulated power supplies DCDC1 and DCDC2, configuration of the power supply apparatus 100c, etc., which can be beforehand obtained through start test and the like. The designer of the power supply apparatus 100c sets each of the insulated power supplies DCDC1 and DCDC2 so as to delay the timing signal by a time period equal to or longer than the output power rise delay time obtained through the start test and the like.

The two sorts of power outputted from the respective delay sections 21-1 and 21-2 are wired-ORed and inputted to the RC terminals of the non-insulated power supplies DCDC3 to DCDC7. When the two sorts of power outputted from the plural delay sections 21-1 and 21-2 are both "High", the RC terminals of the non-insulated power supplies DCDC3 to DCDC7 become "High", the non-insulated power supplies DCDC3 to DCDC7 thereby simultaneously start.

In the power supply apparatus 100c according to the third embodiment, realized is an AND section which obtains a logical product of the two sorts of power outputted from the plural delay sections 21-1 and 21-2 by wired-ORing the two sorts of power outputted from the delay sections 21-1 and 21-2 and inputting the obtained result to the RC terminals of the non-insulated power supplies DCDC3 to DCDC7.

In the power supply apparatus 100c according to the third embodiment, the monitoring circuit 20-1 is supplied driving power from the insulated power supply DCDC1 to operate, while the monitoring circuit 20-2 is supplied driving power from the insulated power supply DCDC2 to operate, as shown in FIG. 7.

In concrete, in the timing adjuster 20c, the power outputted from the +Vout terminal of the insulated power supply DCDC1 to be inputted to the non-insulated power supplies DCDC3 and DCDC4 is branched and inputted to a power supply terminal on the plus side (plus-side power supply terminal) of the comparator IC1 of the monitoring circuit 20-1, while the power outputted from the +Vout terminal of the insulated power supply DCDC2 to be inputted to the non-insulated power supplies DCDC5 to DCDC7 is branched and inputted to a plus-side power supply terminal of the comparator IC2 of the monitoring circuit 20-2, as shown in FIG. 7.

The power supply apparatus 100c according to the third embodiment of this invention not only can provide the same working effects as the above-mentioned first embodiment, but also can be applied to a power supply apparatus having three or more insulated power supplies DCDC.

Next, states of voltages at the respective sections in the power supply apparatus 100c according to the third embodiment of this invention will be described with reference to a timing chart shown in FIGS. 8(a) to 8(k).

FIGS. 8(a) through 8(k) are a timing chart showing processing at the sections in the power supply apparatus 100c according to the third embodiment of this invention. FIG. 8(a) is a diagram showing an intermediate voltage Vi1 outputted from the insulated power supply DCDC1. FIG. 8(b) is a diagram showing an intermediate voltage Vi2 outputted from the insulated power supply DCDC2. FIG. 8(c) is a diagram showing a timing signal outputted from the monitoring circuit 20-1. FIG. 8(d) is a diagram showing a timing signal outputted from the monitoring circuit 20-2. FIG. 8(e) is a diagram showing a sum of the timing signal outputted from the monitoring circuit 20-1 in FIG. 8(c) and the timing signal outputted from the monitoring circuit 20-2 in FIG. 8(d). FIG. 8(f) is a diagram showing a signal inputted to a V1 terminal of the load element LOAD1. FIG. 8(g) is a diagram showing a signal inputted to a V2 terminal of the load element LOAD1. FIG. 8(h) is a diagram showing a signal inputted to a V3 terminal of the load element LOAD1. FIG. 8(i) is a diagram showing a signal inputted to a V1 terminal of the load element LOAD2. FIG. 8(j) is a diagram showing a signal inputted to a V2 terminal of the load element LOAD2. FIG. 8(k) is a diagram showing a signal inputted to a V3 terminal of the load element LOAD2.

FIGS. 8(a) through 8(k) show an example where the insulated power supply DCDC1 starts (is activated) and initiates power supply before the insulated power supply DCDC2 starts.

As shown in FIGS. 8(a) and 8(b), in the power supply apparatus 100c according to the third embodiment, even when the start of the insulated power supply DCDC2 (refer to time T2 in FIG. 8(b)) lags behind the start of the insulated power supply DCDC1 (refer to time T1 in FIG. 8(a)) between the insulated power supplies DCDC1 and DCDC2 and a difference in the start time generates (refer to FIGS. 8(a) and 8(b)), the timing signal outputted from the comparator IC1 is delayed by a predetermined delay time (refer to Delay1 in FIG. 8(c)) set beforehand by the delay section 21-1. Since the delay time (Delay1) is set to a time period equal to or longer than a rise delay time of the insulated power supply DCDC2, the timing signal inputted to the non-insulated power supplies DCDC3 to DCDC7 is certainly kept "Low" (refer to FIG. 8(c)) until the start-up of the insulated power supply DCDC2 is completed (refer to time T2 in FIG. 8(b)).

In the power supply apparatus 100c according to the third embodiment, even when the output of the comparator IC2 of the monitoring circuit 20-2 corresponding to the insulated power supply DCDC2, which starts later than the insulated power supply DCDC1, is undeterminable at the time of start of the power supply apparatus 100c, the wired-OR outputs of the comparators IC1 and IC2 are kept "Low" owing to the delay section 21-1 (refer to time T0 to T3 in FIG. 8(e)), whereby the non-insulated power supplies DCDC3 to DCDC7 keep stopped (refer to FIGS. 8(f) to 8(k)).

When the delay time has elapsed since the timing signal is inputted from the monitoring circuit 20-1 to the delay section 21-1, the delay circuit 21-1 starts to output the timing signal (refer to point C1 in FIG. 8(c)).

When the insulated power supply DCDC2 starts, lagging behind the insulated power supply DCDC1 (refer to time T2 in FIG. 8(b)), the timing signal outputted from the monitoring circuit 20-2 is inputted to the delay section 21-2, delayed by a delay time (Delay2) by the delay section 21-2, and outputted from the delay section 21-2 (refer to time T3 and point C2 in FIG. 8(d)).

When the both outputs of the delay sections 21-1 and 21-2 change to "High" (refer to time T3), the wired-OR output thereof changes to "High" (refer to FIG. 8(e)), the timing signal (start signal) is inputted to the RC terminals of the non-insulated power supplies DCDC3 to DCDC7, and the non-insulated power supplies simultaneously start. Namely, in the power supply apparatus 100c according to the third embodiment, after the insulated power supplies DCDC1 and DCDC2 all start certainly, the timing signal is sent out to the non-insulated power supplies DCDC3 to DCDC7.

Figure 9:
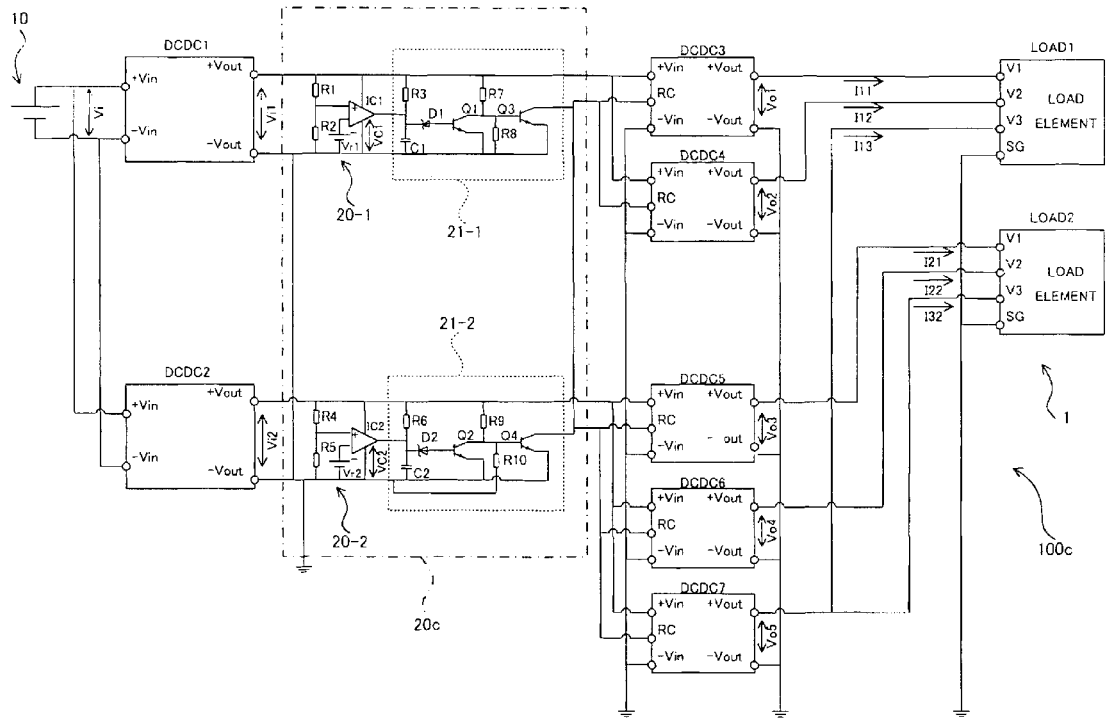
FIG. 9 is a diagram showing an example of concrete configuration of a timing adjuster of the power supply apparatus according to the third embodiment of this invention.

FIG. 9 is a diagram showing an example of concrete configuration of the timing adjuster 20c in the power supply apparatus 100c according to the third embodiment of this invention.

In the example shown in FIG. 9, the monitoring circuit 20-1 has voltage dividing resistors R1 and R2 which divide the output voltage of the insulated power supply DCDC1, while the monitoring circuit 20-2 has voltage dividing resistors R4 and R5 which divide the output voltage of the insulated power supply DCDC2, a resistance value of each of the voltage dividing voltages R1, R2, R3 and R4 being beforehand set.

In the monitoring circuits 20-1 and 20-2, each of the comparators IC1 and IC2 outputs a "Low" (0) signal ("Low" output) when the divided voltage value of the insulated power supply DCDC1 or DCDC2 divided by the voltage dividing resistors R1 and R2, or R3 and R4 is lower than the reference voltage Vr1 or Vr2, and when the divided voltage value is higher than the reference voltage Vr1 outputs a "High" signal ("High" output).

The delay section 21-1 has resistors R3, R7 and R8, a capacitor C1, transistors Q1 and Q3 and a diode D1. The resistor R3 and the capacitor C1 together form a CR timer to generate the delay time with the use of charge/discharge characteristics of the capacitor C1 and the resistor R3. The transistors Q1 and Q3 together function as a transistor of the delay circuit, and the resistors R7 and R8 are bias resistances of the transistors Q1 and Q3, respectively. The diode D1 is a Zener diode.

Like the delay section 21-1, the delay section 212 has resistors R6, R9 and R10, a capacitor C2, transistors Q2 and Q4 and a diode D2. The resistor R6 and the capacitor C2 together form a CR timer. The transistors Q2 and Q4 together function as a transistor of the delay circuit, and the resistors R9 and R10 are bias resistances of the transistors Q2 and Q4, respectively. The diode D2 is a Zener diode.

The output of the diode Q3 of the delay section 21-1 and the output of the diode Q4 of the delay section 21-2 are connected to each other, and further connected to the RC terminals of the non-insulated power supplies DCDC3 to DCDC7.

The delay time of each of the delay section 21-1 and 21-2 is set to a time period equal to or longer than the output power rise delay time of the corresponding insulated power supply DCDC1 or DCDC2. The designer of the power supply apparatus 100c sets each delay time by appropriately selecting and changing the resister R3 or R6, the capacitor C1 or C2 and so forth on the basis of characteristics of the insulated power supply DCDC1 or DCDC2.

In the delay circuit 21-1, when the output of the comparator IC1 is "Low", the voltage of the capacitor C1 is 0V, the transistor Q1 is in the "OFF" state, then, the transistor Q3 is turned "ON" to output "Low". When the output (timing signal) of the comparator IC1 is changed to "High", charging of the capacitor C1 through the resistor R3 starts.

When the charging of the capacitor C1 proceeds and a certain period of time has elapsed, the voltage of the capacitor C1 becomes equal to or greater than the Zener voltage of the diode (Zener diode) D1 to turn the transistor Q1 "ON". When the transistor Q1 is turned "ON", the transistor Q3 is turned "OFF", then the output (timing signal) of the transistor Q3 is changed to "High". As this, the delay operation is performed.

Likewise, in the delay circuit 21-2, when the output of the comparator IC2 is "Low", the voltage of the capacitor C2 is 0V, the diode Q2 is in the "OFF" state, then the transistor Q4 is turned "ON" to output "Low". When the output (timing signal) of the comparator IC2 is changed to "High", charging of the capacitor C2 through the resistor R6 is started.

When the charging of the capacitor C2 proceeds and a certain period of time has elapsed, the voltage of the capacitor C2 becomes equal to or greater than the Zener voltage of the diode (Zener diode) D2 to turn the transistor Q2 "ON". When the transistor Q2 is turned "ON", the transistor Q4 is turned "OFF", the output (timing signal) of the transistor Q4 is thereby changed to "High". As this, the delay operation is performed.

The comparators IC1 and IC2 in the monitoring circuits 20-1 and 20-2 determine that the output voltages of the insulated power supplies DCDC1 and DCDC2 are activated when the divided voltage values of the output voltages of the insulated power supplies DCDC1 and DCDC2 exceed the reference values VR1 and VR2, respectively, then change from "Low" to "High". When the comparators IC1 and IC2 change from "Low" to "High", the outputs of the transistors Q3 and Q4 configuring the respective delay sections 21-1 and 21-2 change from "Low" to "High".

Since the outputs of the transistors Q3 and Q4 are connected to each other, when one of the transistors Q3 and Q4 is "Low", that is, when the divided voltage value of the output voltage does not satisfy the reference voltage, the RC terminals of the non-insulated power supplies DCDC3 to DCDC7 remain "Low", hence their stopping state is kept. When the both outputs of the transistors Q3 and Q4 are "High", that is, when the divided voltage values of the output voltages of the insulated power supplies DCDC1 and DCDC2 exceed the reference voltages and a predetermined period of time has elapsed, the RC terminals of the non-insulated power supplies DCDC3 to DCDC7 are changed to "High", the non-insulated power supplies DCDC3 to DCDC7 thereby simultaneously start.

Next, states of voltages at the respective sections in the power supply apparatus 100c configured as above according to the third embodiment of this invention will be described with reference to a timing chart shown in FIGS. 10(a) through 10(m).

FIG. 10(a) is a diagram showing an intermediate voltage Vi1 outputted from the insulated power supply DCDC1. FIG. 10(b) is a diagram showing an intermediate voltage Vi2 outputted from the insulated power supply DCDC2. FIG. 10(c) is a diagram showing a voltage Vc1 applied to the capacitor C1 of the delay section 21-1. FIG. 10(d) is a diagram showing a voltage Vc2 applied to the capacitor C2 of the delay section 21-2. FIG. 10(e) is a diagram showing a timing signal outputted from the transistor Q3 of the delay section 21-1. FIG. 10(f) is a diagram showing a timing signal outputted from the transistor Q4 of the delay section 21-2. FIG. 10(g) is a diagram showing a wired output of the timing signal outputted from the transistor Q3 of the delay section 21-1 in FIG. 10(e) and the timing signal outputted from the transistor Q4 of the delay section 21-2 in FIG. 10(f). FIG. 10(h) is a diagram showing a signal inputted to a V1 terminal of the load element LOAD1. FIG. 10(i) is a signal inputted to a V2 terminal of the load element LOAD1. FIG. 10(j) is a diagram showing a signal inputted to a V3 terminal of the load element LOAD1. FIG. 10(k) is a diagram showing a signal inputted to a V1 terminal of the load element LOAD2. FIG. 10(l) is a diagram showing a signal inputted to a V2 terminal of the load element LOAD2. FIG. 10(m) is a diagram showing a signal inputted to a V3 terminal of the load element LOAD2.

FIGS. 10(a) to 10(m) show an example where the insulated power supply DCDC1 starts (is activated) and initiates power supply before the insulated power supply DCDC2 starts.

In a state where the power supply apparatus 100c does not yet start and both the insulated power supplies DCDC1 and DCDC2 do not yet start (stopping state) (refer to time T0 to T1), the power is supplied to neither the comparator IC1 of the monitoring circuit 20-1 nor the comparator IC2 of the monitoring circuit 20-2, hence outputs of these comparators IC1 and IC2 are uncertain. The power is not supplied to the non-insulated power supplies DCDC3 to DCDC7 (stopping state), hence these non-insulated power supplies DCDC3 to DCDC7 do not start. Accordingly, uncertain power supply from the non-insulated power supplies DCDC3 to DCDC7 to the load elements LOAD1 and LOAD2 is not performed.

Incidentally, an area where the outputs of the comparators IC1 and IC2 are uncertain is designated by slanted lines in FIGS. 10(e) and 10(f).

When the power supply apparatus 100c starts and the insulted power supply DCDC1 first starts and its output voltage is activated (time T1; refer to point D1 in FIG. 10(a)), the output of the comparator IC1 of the monitoring circuit 20-1 becomes "High", hence charging of the capacitor C1 starts owing to the operation of the delay section 21-1 (refer to time T1 in FIG. 10(c)). When the charging of the capacitor C1 proceeds and a certain period of time has elapsed, the voltage of the capacitor C1 becomes equal to or greater than the Zener voltage of the diode (Zener diode) D1 (refer to time T3 in FIG. 10(c)) to turn the transistor Q1 "ON".

When the transistor Q1 is turned "ON", the transistor Q3 is turned "OFF", the output (timing signal) of the transistor Q3 is thereby changed to "High" (refer to point D3 in FIG. 10(e)).

Until the voltage of the capacitor C1 exceeds the Zener voltage of the Zener diode D1, that is, for the output power rise delay time (Delay1: refer to time T1 to T3 in FIG. 10(c)), the transistor Q3 is kept "Low" (refer to FIG. 10(e).

Figure 10:
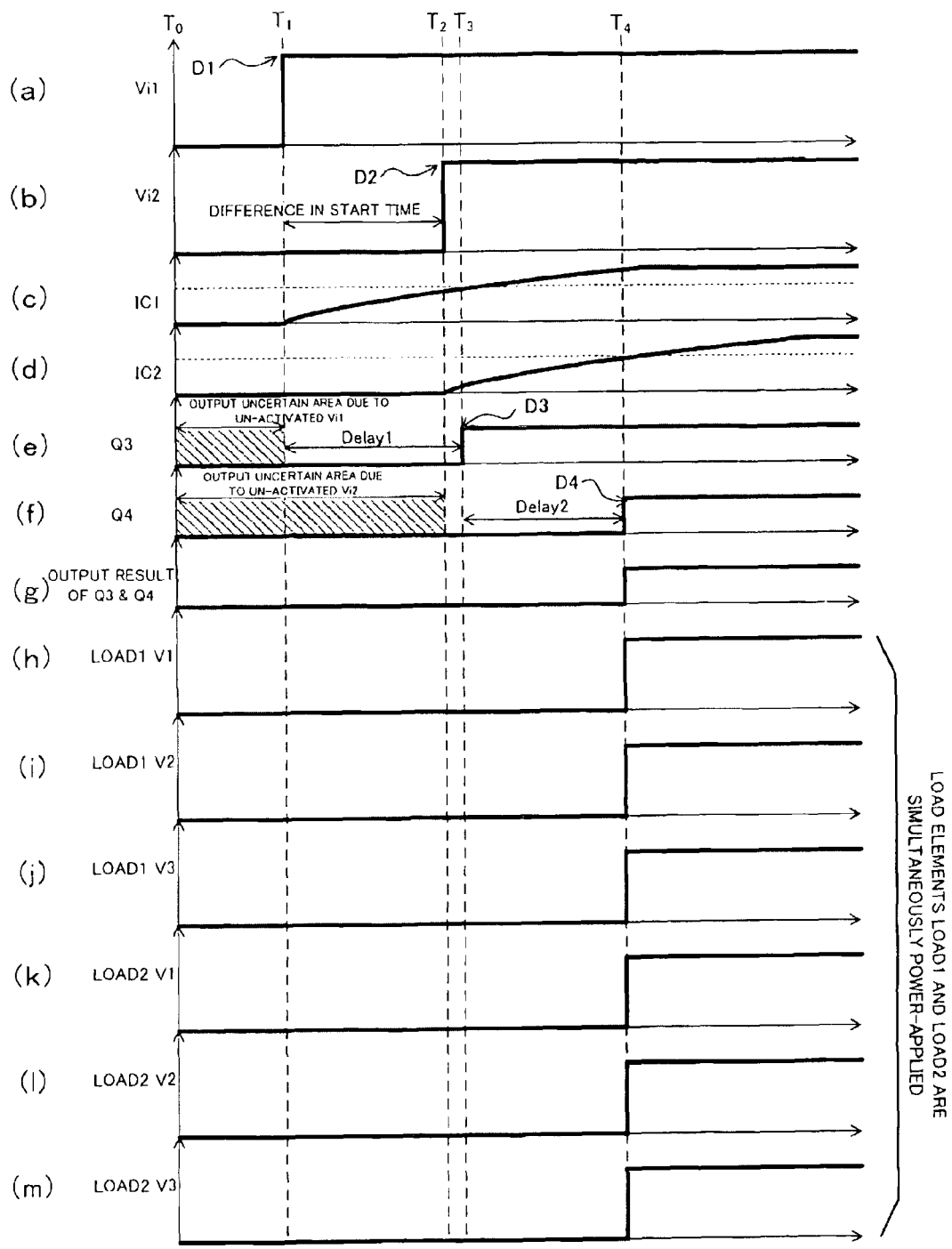
FIGS. 10(a) through 10(m) are a timing chart showing states of voltage at sections in the power supply apparatus according to the third embodiment of this invention.
Figure 11:
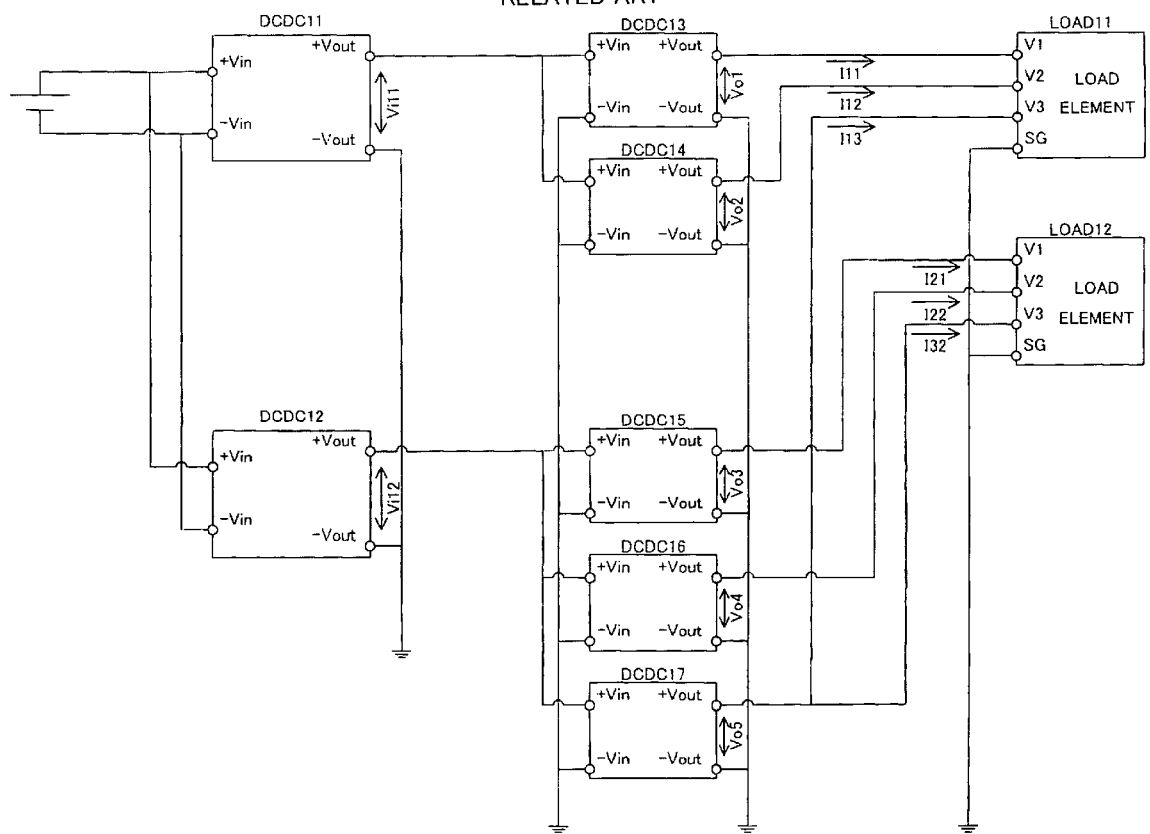
FIG. 11 is a diagram schematically showing an example of configuration of a power supply apparatus having a known IBA feeding power supply configuration.
Figure 12:
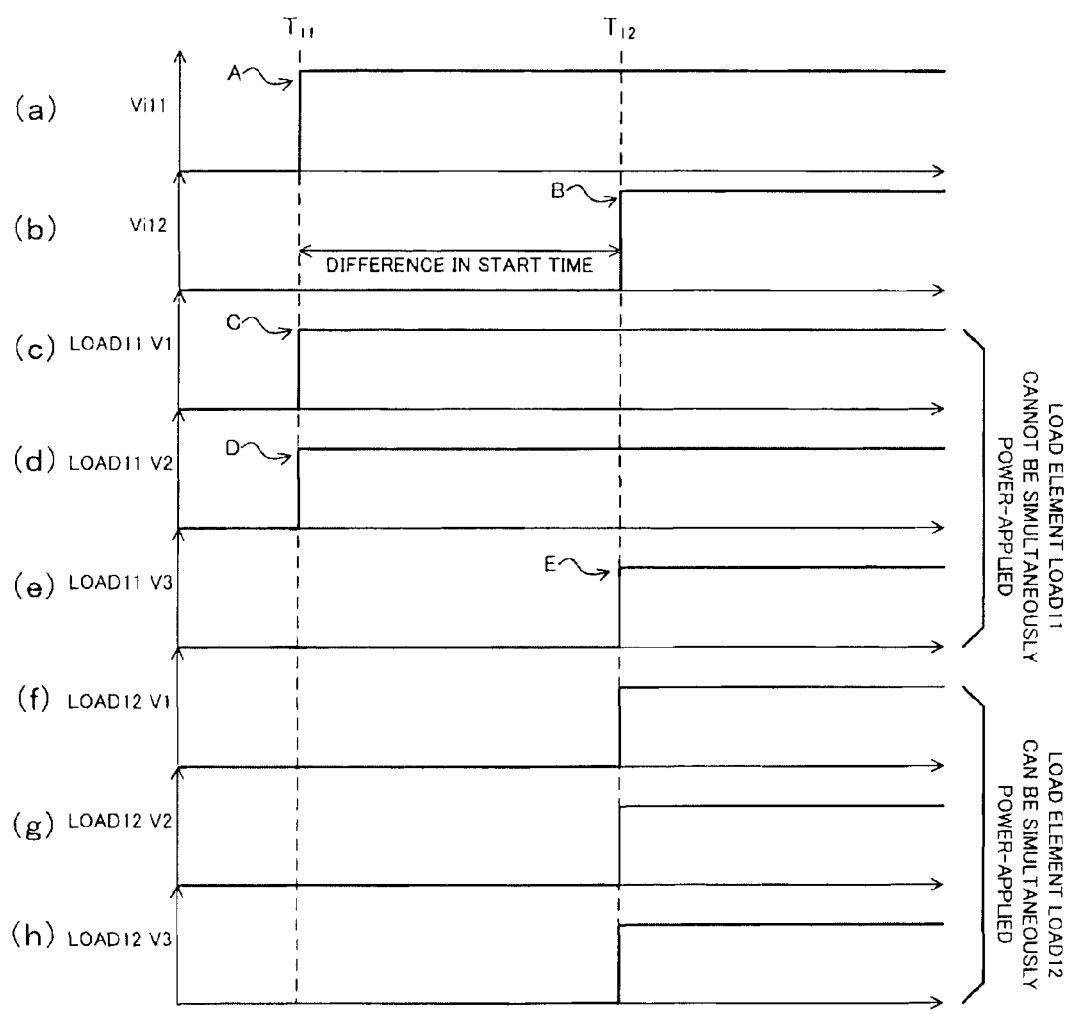
FIGS. 12(a) through 12(h) are a timing chart showing states of voltage at sections in the known power supply apparatus in FIG. 11.
Figure 13:
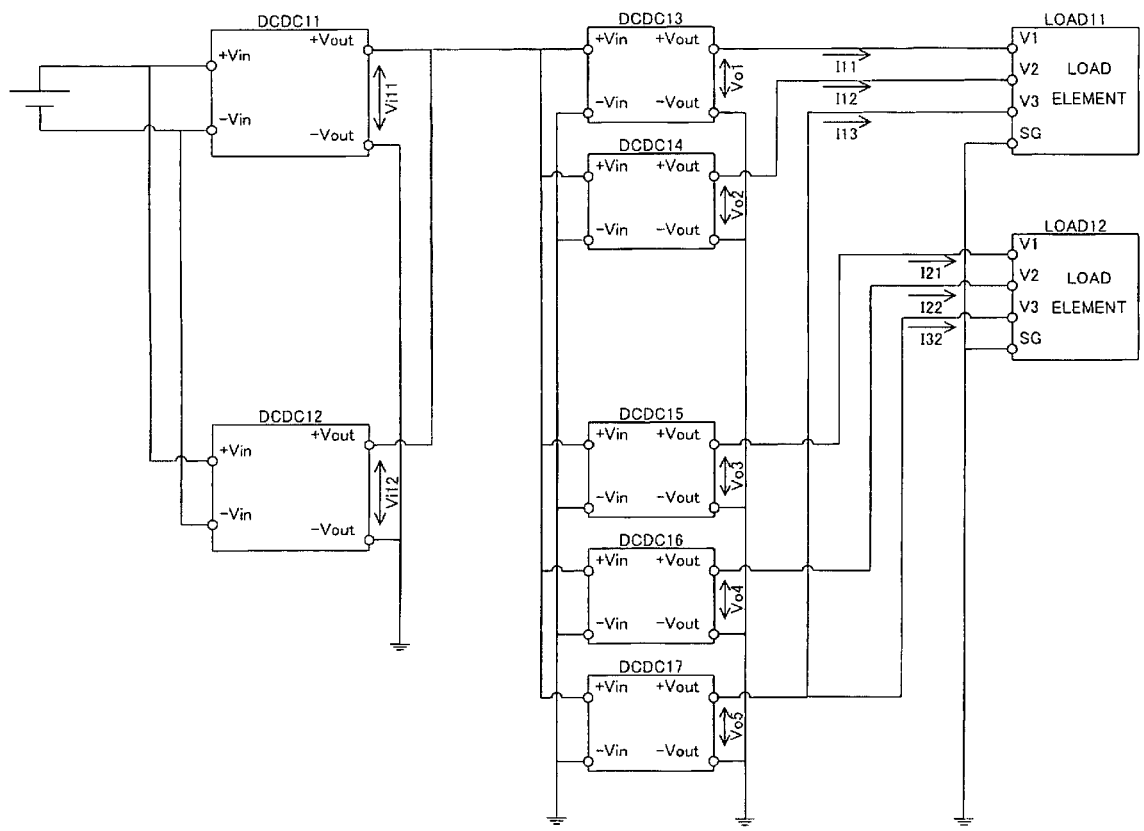
FIG. 13 is a diagram schematically showing an example of another configuration of the known power supply.
Figure 14:
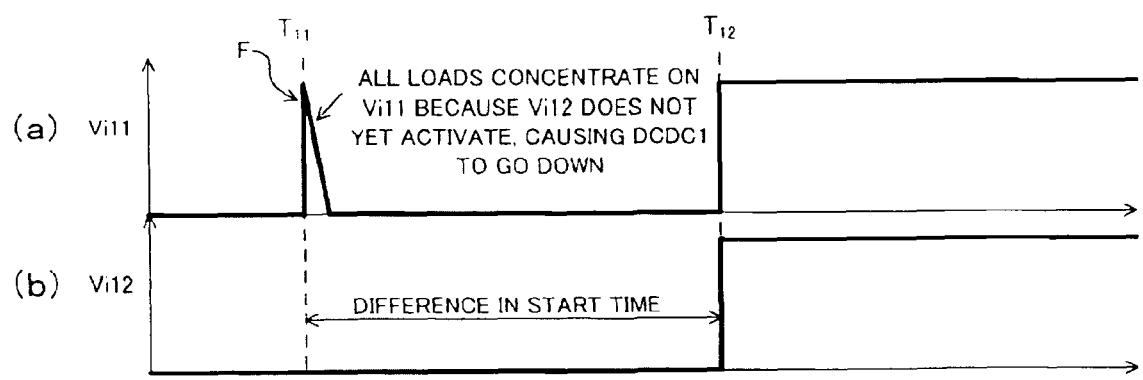
FIGS. 14(a) and 14(b) are a timing chart showing states of voltage at sections in the known power supply configuration in FIG. 13.

Until the insulated power supply DCDC2 starts (refer to time T0 to T2 in FIG. 10(b)), the diode Q4 is uncertain (refer to FIG. 10(*f*)). However, since the output of the transistor Q3 of the delay section 21-1 is "Low", the RC terminals of the non-insulated power supplies DCDC3 to DCDC7 remain "Low" to keep their stopping state (refer to FIG. 10(*g*)).

Thereafter, when the output voltage of the insulated power supply DCDC 2 is activated late (time T2; refer to point D2 in FIG. 10(*b*)), the output of the comparator IC2 of the monitoring circuit 20-2 becomes "High", and charging of the capacitor C2 is started owing to the operation of the delay section 21-2 (refer to time T2 in FIG. 10(*d*)). When the charging of the capacitor C2 proceeds and a certain period of time has elapsed, the voltage of the capacitor C2 exceeds the Zener voltage of the diode (Zener diode) D2 (refer to time T4 in FIG. 10(*d*)) to turn the transistor Q2 "ON".

When the transistor Q2 is turned "ON", the transistor Q4 is turned "OFF" to change the output (timing signal) of the same to "High" (refer to point D4 in FIG. 10(*d*)).

Until the voltage of the capacitor C2 exceeds the Zener voltage of the Zener diode D2, that is, for the output voltage rise delay time (Delay2; refer to time T2 to T4 in FIG. 10(*d*)), the transistor Q4 is kept "Low" (refer to FIG. 10(*f*)).

When the insulated power supply DCDC1 starts, the monitoring circuit 20-1 detects that the output voltage of the insulated power supply DCDC1 is activated and inputs the timing signal to the delay section 21-1. The transistor Q3 is changed from "Low" to "High" in the delay circuit 21-1 after the output voltage rise delay time (Delay1) thereof has elapsed (refer to time T3 in FIG. 10(*e*) Since the output of the transistor Q4 of the delay section 21-2 is "Low" at this point of time, the RC terminals of the non-insulated power supplies DCDC3 to DCDC7 are kept "Low" to hold their stopping state (refer to time T3 to T4 in FIG. 10(*f*)).

When the insulated power supply DCDC2 starts and the monitoring circuit 20-2 detects that the output voltage of the insulated power supply DCDC2 is activated, the output of the comparator IC2 thereof becomes "High" to input the timing signal to the delay section 21-2. In the delay section 21-2, after the output power rise delay time (Delay2) has elapsed, outputs of the transistors Q2 and Q4 in the delay section 21-2 are changed to "High" (refer to time T4 in FIG. 10(*f*))

Whereby, RC signals of the non-insulated power supplies DCDC3 to DCDC7 are changed from "Low" to "High" (refer to point D4 in FIG. 10(*f*)), and the non-insulated power supplies DCDC3 to DCDC7 simultaneously start (refer to FIGS. 10(*h*) to 10(*m*)).

As this, the power is supplied almost simultaneously to the V1 terminals, V2 terminals and V3 terminals of the load elements LOAD1 and LOAD2.

Like the power supply apparatus 100*a* according to the first embodiment, the power supply apparatus 100*c* according to the third embodiment of this invention can prevent an unstable timing signal from being inputted to the non-insulated power supplies DCDC3 to DCDC7 in the following stage of the insulated power supplies DCDC1 and DCDC2 even when the insulated power supplies DCDC1 and DCDC2 do not simultaneously start, thereby to supply stable power to the load elements LOAD1 and LOAD2, which improves the reliability.

The outputs of the plural delay sections 21-1 and 21-2 are connected to each other (wired-ORed). Accordingly, when one of the outputs is "Low", that is, when the divided voltage value of the output voltage does not satisfy the reference voltage, the RC terminals of the non-insulated power supplies DCDC3 to DCDC7 are kept "Low" so that the non-insulated power supplies DCDC3 to DCDC7 can keep their stopping state.

Even when only either one (for example, the insulated power supply DCDC1) of the plural insulated power supplies DCDC1 and DCDC2 starts, the timing signal inputted from the monitoring circuit 20-1 is delayed until the other insulated power supply (for example, the insulated power supply DCDC2) starts and its output power becomes stable (delayed by a time period longer than the rise delay time), then the timing signal is outputted. In other words, since the delay section keeps the "Low" state while the timing signal is delayed, the RC terminals of the non-insulated power supplies DCDC3 to DCDC7 are kept "Low" even when the other insulated power supply (for example, the insulated power supply DCDC2) does not yet start and the corresponding monitoring circuit 20-2 is in the output uncertain state to output an uncertain output signal (timing signal). Whereby, these non-insulated power supplies DCDC3 to DCDC7 can keep their stopping state.

As above, uncertain power supply from the non-insulated power supplies DCDC3 to DCDC7 to the load elements LOAD1 and LOAD2 is not performed.

When the outputs of both the comparators IC1 and IC2 become "High", their timing signal are delayed by a time period equal to or longer than their output power rise delay times (Delay1, Delay2) by the delay sections 21-1 and 21-2. And, when these delay timing signals both become "High", the non-insulated power supplies simultaneously start so that the power can be supplied almost simultaneously from the non-insulated power supplies DCDC3 to DCDC7 to the V1 terminals, the V2 terminals and the V3 terminals of the load elements LOAD1 and LOAD2. Even when a difference in the start time generates between the plural insulated power supplies DCDC1 and DCDC2, it is possible to start the non-insulated power supplies DCDC3 to DCDC7 all together at the same timing to supply stable power to the load elements LOAD1 and LOAD2.

As above, it is possible to efficiently distribute the power of the non-insulated power supplies to the load elements without wastefully decentralizing the non-insulated power supplies DCDC3 to DCDC7 due to a difference in start time between the plural insulated power supplies DCDC1 and DCDC2 in the power supply apparatus 100*c* according to the third embodiment of this invention.

Likewise, the insulated power supplies DCDC1 and DCDC2 supplying the power to the non-insulated power supplies DCDC3 to DCDC7 can efficiently distribute the power to the non-insulated power supplies DCDC3 to DCDC7 thereunder.

Since there is no need to consider variations in delay of the start time of the insulated power supplies DCDC1 and DCDC2, use of inexpensive power supply and reduction in the manufacturing cost are feasible.

In the power supply apparatus 100*c* according to the third embodiment, the number of the insulated power supplies DCDC may be three or more.

The insulated power supplies DCDC1 and DCDC2 converting the voltage of the primary power source 10 into lower voltages (intermediate voltages, intermediate electric potentials) are provided in the preceding stage of the small-sized, non-insulated power supplies (POL converters) DCDC3 to DCDC7. This enables a reduction in size of the POL power supply and secure insulation inside the apparatus.

Disclosure of the embodiments of the present invention enables a person skilled in the art to implement this invention and manufacture the apparatus of this invention.

(D) Others

Note that the present invention is not limited to the above-described embodiments, but may be carried out in various ways without departing from the spirit and scope of the invention.

In the above embodiments, the electronic apparatus 1 has two insulated power supplies DCDC1 and DCDC2, five non-insulated power supplies DCDC3 to DCDC7 and two load elements LOAD1 and LOAD2. However, this invention is not limited to this example. The electronic apparatus 1 may have three or more insulated power supplies (primary power supply), four or less, or six or more non-insulated power supplies (secondary power supply), and three or more load elements.

The electronic apparatus 1 is not limited to a computer, but may be various equipment having the power supply apparatus to operate.

Further, at least two techniques according to the first to third embodiments may be combined to implement the invention.

INDUSTRIAL APPLICABILITY

The present invention may be applied to a power supply apparatus supplying power to load elements through power supply apparatus (converter) in plural stages, other than a power supply apparatus configured in POL (Point Of Load) system having non-insulated power supplies in the vicinity of load elements.

What is claimed is:

1. A power supply apparatus converting a primary power supply voltage of electric power supplied from a primary power source into supply voltages and outputting the electric power with each of the supply voltages, comprising:
a plurality of primary power supplies converting the primary power supply voltage into intermediate voltages;
a secondary power supply converting the intermediate voltages converted by said primary power supply into the supply voltages and outputting the supply voltages; and
a timing adjuster inputted thereto the power converted into the intermediate voltages from said plural primary power supplies to perform timing adjustment to absorb a difference in start timing between said plural primary power supplies, and causing said secondary power supply to output the supply voltages, said tinning adjuster comprising a plurality of timing signal output sections provided for each of said plural primary power supplies, each of said timing signal output sections being able to output a timing signal on the basis of the power inputted from the corresponding primary power supply, each of said plural timing signal output sections being supplied with driving power from another one of said primary power supplies different from the corresponding primary power supply to operate, each of said plural timing signal output sections comprising a combining section combining plural driving power supplied from said plural primary power supplies, said timing signal output section being supplied with the driving power combined by said combining section.

2. The power supply apparatus according to claim 1, wherein said timing adjuster comprises:
a plurality of timing signal output sections provided for each of said plural primary power supplies, each of said timing signal output sections being able to output a timing signal on the basis of the power inputted from the corresponding primary power supply;
a plurality of delay sections, provided for each of said plural timing signal output sections, each of said plural delay sections delaying the timing signal input from the corresponding timing signal output section for a time period longer than an output power rise delay time of at least one of the remaining primary power supplies except the primary power supply associated with the corresponding timing signal output section; and
an AND section ANDing the timing signals outputted from said plural delay sections.

3. The power supply apparatus according to claim 1, wherein each of said timing signal output sections comprises a voltage comparator comparing an output voltage of a primary power supply corresponding to its own timing signal output section with a reference voltage to output an inhibit signal being able to inhibit said secondary power supply from performing an output operation when said voltage comparator is not conducted.

4. The power supply apparatus according to claim 1, wherein each of said timing signal output sections comprises a voltage comparator comparing an output voltage of a primary power supply corresponding to its own timing signal output section with a reference voltage to output an inhibit signal being able to inhibit said secondary power supply from performing an output operation when said voltage comparator is not conducted.

5. The power supply apparatus according to claim 2, wherein each of said timing signal output sections comprises a voltage comparator comparing an output voltage of a primary power supply corresponding to its own timing signal output section with a reference voltage to output an inhibit signal being able to inhibit said secondary power supply from performing an output operation when said voltage comparator is not conducted.

6. The power supply apparatus according to claim 1, wherein said secondary power supply comprises a control signal input section through which a signal is input into said secondary power supply to control start and stop of said secondary power supply; and
said timing adjuster inputs the timing signal into said secondary power supply through said control signal input section to output the supply voltages from said secondary power supply.

7. The power supply apparatus according to claim 1, wherein said secondary power supply comprises a control signal input section through which a signal is input into said secondary power supply to control start and stop of said secondary power supply; and
said timing adjuster inputs the timing signal into said secondary power supply through said control signal input section to output the supply voltages from said secondary power supply.

8. The power supply apparatus according to claim 2, wherein said secondary power supply comprises a control signal input section through which a signal is input into said secondary power supply to control start and stop of said secondary power supply; and
said timing adjuster inputs the timing signal into said secondary power supply through said control signal input section to output the supply voltages from said secondary power supply.

9. An electronic apparatus comprising:
a plurality of load elements operating at supply voltages;
a plurality of primary power supplies converting a primary power supply voltage of electric power supplied from a primary power source into intermediate voltages;

a secondary power supply converting the intermediate voltages converted by said primary power supplies to the supply voltages; and a timing adjuster inputted thereto power converted into the intermediate voltages from said plural primary power supplies to perform timing adjustment to absorb a difference in start timing between said plural primary power supplies, and causing said secondary power supply to output the supply voltages, said timing adjuster comprising a plurality of timing signal output sections provided for each of said plural primary power supplies, each of said timing signal output sections being able to output a timing signal on the basis of the power inputted from the corresponding primary power supply, each of said plural timing signal output sections being supplied with driving power from another one of said primary power supplies different from the corresponding primary power supply to operate, each of said plural timing signal output sections comprising a combining section combining plural driving power supplied from said plural primary power supplies, said timing signal output section being supplied with the driving power combined by said combining section.

10. The electronic apparatus according to claim 9, wherein said timing adjuster comprises:

a plurality of timing signal output sections provided for each of said plural primary power supplies, each of said timing signal output sections being able to output a timing signal on the basis of the power inputted the corresponding primary power supply;

a plurality of delay sections, provided for each of said plural timing signal output sections, each of said plural delay sections delaying the timing signal input from the corresponding timing signal output section for a time period longer than an output power rise delay time of at least one of the remaining primary power supplies except the primary power supply associated with the corresponding timing signal output section; and an AND section ANDing the timing signals outputted from said plural delay sections.

11. The electronic apparatus according to claim 9, wherein each of said timing signal output sections comprises a voltage comparator comparing an output voltage of a primary power supply corresponding to its own timing signal output section with a reference voltage to output an inhibit signal being able to inhibit said secondary power supply from performing an output operation when said voltage comparator is not conducted.

12. The electronic apparatus according to claim 9, wherein each of said timing signal output sections comprises a voltage comparator comparing an output voltage of a primary power supply corresponding to its own timing signal output section with a reference voltage to output an inhibit signal being able to inhibit said secondary power supply from performing an output operation when said voltage comparator is not conducted.

13. The electronic apparatus according to claim 10, wherein each of said timing signal output sections comprises a voltage comparator comparing an output voltage of a primary power supply corresponding to its own timing signal output section with a reference voltage to output an inhibit signal being able to inhibit said secondary power supply from performing an output operation when said voltage comparator is not conducted.

14. The electronic apparatus according to claim 9, wherein said secondary power supply comprises a control signal input section through which a signal is input into said secondary power supply to control start and stop of said secondary power supply; and said timing adjuster inputs the timing signal into said secondary power supply through said control signal input section to output the supply voltages from said secondary power supply.

15. The electronic apparatus according to claim 10, wherein said secondary power supply comprises a control signal input section through which a signal is input into said secondary power supply to control start and stop of said secondary power supply; and said timing adjuster inputs the timing signal into said secondary power supply through said control signal input section to output the supply voltages from said secondary power supply.

16. The electronic apparatus according to claim 13, wherein said secondary power supply comprises a control signal input section through which a signal is input into said secondary power supply to control start and stop of said secondary power supply; and said timing adjuster inputs the timing signal into said secondary power supply through said control signal input section to output the supply voltages from said secondary power supply.

* * * * *